(12) United States Patent
Blank et al.

(10) Patent No.: US 7,726,822 B2
(45) Date of Patent: Jun. 1, 2010

(54) INTERIOR REARVIEW MIRROR SYSTEM

(75) Inventors: Rodney K. Blank, Zeeland, MI (US); Kenneth L. Schierbeek, Zeeland, MI (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 12/575,726

(22) Filed: Oct. 8, 2009

(65) Prior Publication Data

US 2010/0027145 A1 Feb. 4, 2010

Related U.S. Application Data

(63) Continuation of application No. 12/370,043, filed on Feb. 12, 2009, now Pat. No. 7,600,878, which is a continuation of application No. 12/029,073, filed on Feb. 11, 2008, now Pat. No. 7,490,944, which is a continuation of application No. 11/305,637, filed on Dec. 16, 2005, now Pat. No. 7,329,013, and a continuation-in-part of application No. 10/456,599, filed on Jun. 6, 2003, now Pat. No. 7,004,593.

(60) Provisional application No. 60/636,931, filed on Dec. 17, 2004, provisional application No. 60/420,010, filed on Oct. 21, 2002, provisional application No. 60/398,240, filed on Jul. 24, 2002, provisional application No. 60/386,373, filed on Jun. 6, 2002.

(51) Int. Cl.
*G02B 7/182* (2006.01)

(52) U.S. Cl. .................................. 359/879; 359/604

(58) Field of Classification Search ................ 359/871, 359/872, 879, 267, 265, 603, 604, 838, 844; 340/425.5, 426.15, 438; 250/239
See application file for complete search history.

(56) References Cited

U.S. PATENT DOCUMENTS 4,546,551 A 10/1985 Franks (Continued)

FOREIGN PATENT DOCUMENTS

| EP | 1097848 A | 5/2001 |
| WO | WO 0049680 A | 8/2000 |
| WO | WO 0052661 A | 9/2000 |

OTHER PUBLICATIONS

International Search Report dated Oct. 6, 2003, 1 page, received from the International Searching Authority in connection with International Application No. PCT/US03/17804.

(Continued)

*Primary Examiner*—Euncha P Cherry
(74) *Attorney, Agent, or Firm*—Van Dyke, Gardner, Linn & Burkhart, LLP

(57) ABSTRACT

An interior rearview mirror system for a vehicle includes an interior rearview mirror assembly and a control having control circuitry. An information display is disposed behind a transflective reflective element to display information that is viewable through the transflective reflector by a driver of a vehicle when the information display is displaying information. A mounting structure mounts the mirror casing to an interior portion of the vehicle, and the mirror casing is adjustable relative to the interior portion of the vehicle via at least one pivot element of the mounting structure. The control circuitry includes a photosensor and the control controls dimming of the electrochromic medium responsive to detection of light by the photosensor. Electrical wiring connects to at least a portion of the control circuitry that is disposed within the mirror casing. The electrical wiring passes through the pivot element of the mounting structure.

28 Claims, 5 Drawing Sheets

U.S. PATENT DOCUMENTS

| | | | |
|---|---|---|---|
| 4,581,827 A | 4/1986 | Higashi | |
| 4,793,690 A | 12/1988 | Gahan et al. | |
| 4,862,594 A | 9/1989 | Schierbeek et al. | |
| 4,882,565 A | 11/1989 | Gallmeyer | |
| 4,937,945 A | 7/1990 | Schofield et al. | |
| 4,953,305 A | 9/1990 | Van Lente et al. | |
| 5,131,154 A | 7/1992 | Schierbeek et al. | |
| 5,193,029 A | 3/1993 | Schofield et al. | |
| 5,255,442 A | 10/1993 | Schierbeek et al. | |
| 5,339,529 A | 8/1994 | Lindberg | |
| 5,416,478 A | 5/1995 | Morinaga | |
| 5,455,716 A | 10/1995 | Suman et al. | |
| 5,530,240 A | 6/1996 | Larson et al. | |
| 5,576,687 A | 11/1996 | Blank et al. | |
| 5,632,092 A | 5/1997 | Blank et al. | |
| 5,644,851 A | 7/1997 | Blank et al. | |
| 5,668,663 A | 9/1997 | Varaprasad et al. | |
| 5,699,044 A | 12/1997 | Van Lente et al. | |
| 5,708,410 A | 1/1998 | Blank et al. | |
| 5,724,187 A | 3/1998 | Varaprasad et al. | |
| 5,724,316 A | 3/1998 | Brunts | |
| 5,737,226 A | 4/1998 | Olson et al. | |
| 5,761,094 A | 6/1998 | Olson et al. | |
| 5,790,973 A | 8/1998 | Blaker et al. | |
| 5,802,727 A | 9/1998 | Blank et al. | |
| 5,806,879 A | 9/1998 | Hamada et al. | |
| 5,808,197 A | 9/1998 | Dao | |
| 5,877,707 A | 3/1999 | Kowalick | |
| 5,878,370 A | 3/1999 | Olson | |
| 5,899,956 A | 5/1999 | Chan | |
| 5,924,212 A | 7/1999 | Domanski | |
| 5,942,895 A | 8/1999 | Popovic et al. | |
| 6,023,229 A | 2/2000 | Bugno et al. | |
| 6,087,953 A | 7/2000 | DeLine et al. | |
| 6,140,933 A | 10/2000 | Bugno et al. | |
| 6,161,865 A | 12/2000 | Rose et al. | |
| 6,172,613 B1 | 1/2001 | DeLine et al. | |
| 6,173,501 B1 | 1/2001 | Blank et al. | |
| 6,173,508 B1 | 1/2001 | Strohmeyer, Jr. | |
| 6,184,679 B1 | 2/2001 | Popovic et al. | |
| 6,222,460 B1 | 4/2001 | DeLine et al. | |
| 6,278,271 B1 | 8/2001 | Schott | |
| 6,297,781 B1 | 10/2001 | Turnbull et al. | |
| 6,346,698 B1 | 2/2002 | Turnbull | |
| 6,366,213 B2 | 4/2002 | DeLine et al. | |
| 6,386,742 B1 | 5/2002 | DeLine et al. | |
| 6,418,376 B1 | 7/2002 | Olson | |
| 6,427,349 B1 | 8/2002 | Blank et al. | |
| 6,477,464 B2 | 11/2002 | McCarthy et al. | |
| 6,483,438 B2 | 11/2002 | DeLine et al. | |
| 6,513,252 B1 | 2/2003 | Schierbeek et al. | |
| 6,539,306 B2 | 3/2003 | Turnbull | |
| 6,642,851 B2 | 11/2003 | Deline et al. | |
| 6,690,268 B2 | 2/2004 | Schofield et al. | |
| 6,693,517 B2 | 2/2004 | McCarthy et al. | |
| 6,824,281 B2 | 11/2004 | Schofield et al. | |
| 6,922,902 B2 | 8/2005 | Schierbeek et al. | |
| 6,928,366 B2 | 8/2005 | Ockerse et al. | |
| 6,946,978 B2 | 9/2005 | Schofield | |
| 6,968,273 B2 | 11/2005 | Ockerse et al. | |
| 7,004,593 B2 | 2/2006 | Weller et al. | |
| 7,012,543 B2 * | 3/2006 | DeLine et al. | 340/438 |
| 7,329,013 B2 | 2/2008 | Blank et al. | |
| 7,452,090 B2 | 11/2008 | Weller et al. | |
| 7,490,944 B2 | 2/2009 | Blank et al. | |
| 7,600,878 B2 | 10/2009 | Blank et al. | |
| 2001/0055165 A1 | 12/2001 | McCarthy et al. | |
| 2002/0003571 A1 | 1/2002 | Schofield et al. | |
| 2002/0070872 A1 | 6/2002 | DeLine et al. | |
| 2002/0159270 A1 | 10/2002 | Lynam et al. | |
| 2003/0169522 A1 | 9/2003 | Schofield et al. | |
| 2005/0078389 A1 | 4/2005 | Kulas et al. | |
| 2005/0169003 A1 | 8/2005 | Lindahl et al. | |
| 2005/0172504 A1 | 8/2005 | Ohm et al. | |
| 2005/0187675 A1 | 8/2005 | Schofield et al. | |
| 2006/0038668 A1 | 2/2006 | DeWard et al. | |
| 2006/0061008 A1 | 3/2006 | Karner et al. | |
| 2006/0164230 A1 | 7/2006 | DeWind et al. | |
| 2006/0255960 A1 | 11/2006 | Uken et al. | |

OTHER PUBLICATIONS

European Supplementary Search Report dated Mar. 7, 2008, 2 pages, received from the European Patent Office in connection with European Patent Application No. 03736877.6.

* cited by examiner

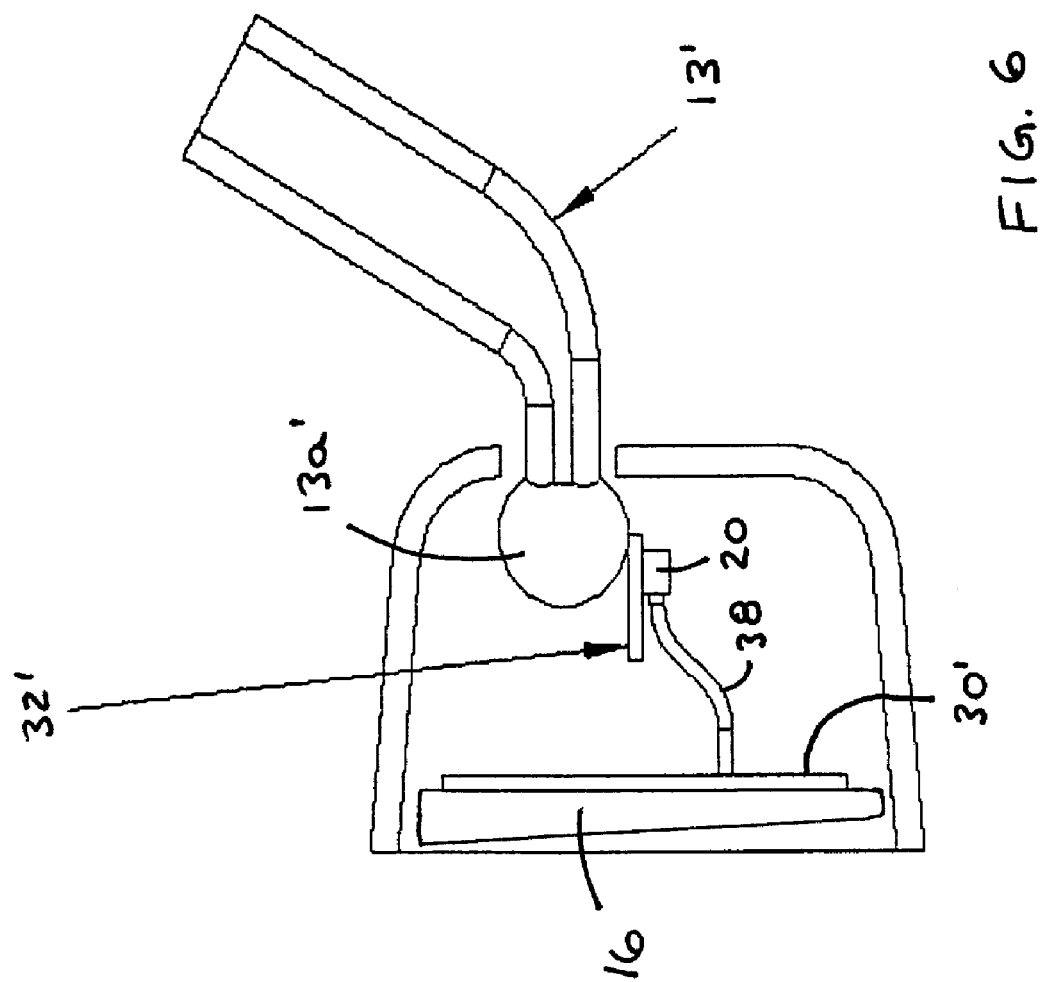

INTERIOR REARVIEW MIRROR SYSTEM

CROSS REFERENCE TO RELATED APPLICATIONS

The present application is a continuation of U.S. patent application Ser. No. 12/370,043, filed Feb. 12, 2009, now U.S. Pat. No. 7,600,878, which is a continuation of U.S. patent application Ser. No. 12/029,073, filed Feb. 11, 2008, now U.S. Pat. No. 7,490,944, which is a continuation of U.S. patent application Ser. No. 11/305,637, filed Dec. 16, 2005, now U.S. Pat. No. 7,329,013, which claims benefit of U.S. provisional application Ser. No. 60/636,931, filed Dec. 17, 2004, and U.S. patent application Ser. No. 11/305,637 is a continuation-in-part of U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which claims the benefit of U.S. provisional applications Ser. No. 60/420,010, filed Oct. 21, 2002; Ser. No. 60/398,240, filed Jul. 24, 2002; and Ser. No. 60/386,373, filed Jun. 6, 2002, which are all hereby incorporated herein by reference in their entireties.

FIELD OF THE INVENTION

The present invention relates generally to interior rearview mirror assemblies for vehicles and, more particularly, to an interior rearview mirror assembly which includes a compass system.

BACKGROUND OF THE INVENTION

Interior rearview mirror assemblies which include a directional or compass display are known, such as the types disclosed in U.S. Pat. No. 5,802,727, which is hereby incorporated herein by reference. Typically, such mirror assemblies include a compass sensor, such as a magnetoresistive sensor, a magneto capacitive sensor, a magnetoinductive sensor, a Hall effect sensor, or a flux gate sensor or the like, which is fixedly attached to the mirror mount that attaches the mirror assembly to a mirror assembly mounting element, such as a conventional mounting button mounted on an interior surface of the windshield of the vehicle. The mirror assemblies also include processing circuitry and a compass information display, typically included in the interior mirror casing (that includes the mirror reflector) which is pivotally adjustable by the driver to suit his or her rearward field of view.

Predominantly, compass mirror assemblies in the market today involve the fixed placement of the compass sensor (and any locally associated sensor circuitry), such as at the mirror mount where the mirror attaches to the windshield or headliner of the vehicle. The compass system typically involves a cable/harness connection to the processing circuitry (which is typically in the pivotable housing of the mirror assembly), which may include the compass compensation circuitry and the like, which feeds or connects to a display (such as a vacuum fluorescent (VF) display or the like) that is typically included in the adjustable mirror casing (such as behind the reflective element so as to display from behind and through the reflective element, or at an eyebrow or chin region of the bezel area of the mirror casing). The display then typically displays an output of the directional heading of the vehicle to the driver or passenger of the vehicle, such as an eight point display, such as N, S, E, W, NE, NW, SE, SW, or the like.

It has been proposed in the art to mount the compass sensor within the movable housing of the rearview mirror assembly. Processes have also been proposed to compensate for movement of the sensor during normal use of the mirror, such as when the mirror head or casing is adjusted by the driver. Such proposed systems, such as described in U.S. Pat. Nos. 6,140,933 and 6,023,229, which are hereby incorporated herein by reference, are often implemented with a specially adapted single ball mount or single pivot mirror assembly. Such compass mirror assemblies can be costly and often involve special tooling and complicated adaptation of the mirror assembly itself and the casing of the mirror assembly. Also, such compass systems as described in the patents referenced above are not readily adapted for use with double ball or double pivot mirror assemblies. Other compass systems and compass compensation systems, such as the types described in U.S. Pat. Nos. 4,581,827; 5,339,529; 5,455,716; 5,699,044; 5,737,226; and 5,808,197, and/or in PCT Publication No. WO 2004/076971 A2, published Sep. 10, 2004; and/or in PCT Publication No. WO 2003/044540 A2, published May 30, 2003; and/or in PCT Publication No. WO 2003/074969 A3, published Sep. 12, 2003 (which are all hereby incorporated herein by reference), may be implemented in interior rearview mirror assemblies, but may be costly and difficult to implement within the movable mirror head of an interior rearview mirror assembly with a single or double ball mounting arrangement.

Therefore, there is a need in the art for an interior rearview mirror assembly having a compass system associated therewith that overcomes the shortcomings of the prior art.

SUMMARY OF THE INVENTION

The present invention is intended to provide an interior rearview mirror system which includes a compass system having a display which indicates the general direction in which the vehicle is traveling.

According to an aspect of the present invention, a mirror and compass system includes an interior rearview mirror assembly having a reflective element and a casing that are adjustable relative to a mounting structure. A compass sensor having at least two magnetoresponsive sensing elements is positioned within the mirror casing and at a position and orientation that reduces the effect of adjustment of the mirror on the compass sensor output.

The compass sensor is preferably positioned at a generally central location of the mirror and at or near the centerline of the mirror head. Preferably, the compass sensor is positioned at or near a lower region of the mirror casing to position the sensor remotely from the roof of the vehicle and any wiring or lights or the like that may be positioned at the roof of the vehicle, in order to reduce the effect of such items on the compass sensor performance.

Preferably, the compass sensor is oriented such that one of the sensing elements is generally along a longitudinal axis of the vehicle and the other sensing element is generally along a cross car axis of the vehicle when the mirror is oriented at a typical in-use position (such as at an angle of about 20 degrees rotation toward the driver side and at an angle of about 9 degrees tilt downward). Optionally, the system may determine when a prismatic mirror is flipped or toggled between the daytime and nighttime orientations and may compensate or adjust the processing of the compass sensor output to compensate for the known movement (such as about 4½ degrees upward or downward) of the mirror head/reflective element and compass sensor.

Optionally, the compass sensor may be positioned in close proximity to the mirror ball of the mounting arm (the ball that is received in the socket at the mirror casing or reflective element or toggle portion of the mirror assembly) so as to reduce movement of the compass sensor when the mirror is adjusted, in order to reduce the effects of mirror adjustment on the compass sensor performance. Optionally, the compass sensor may be generally fixedly positioned relative to the mirror ball of the mounting arm so that the compass sensor is generally fixed and do not move during adjustments of the mirror head/reflective element when the driver grasps and moves the mirror head/reflective element to adjust to his or her preferred field of view rearward through the rear window of the vehicle.

Optionally, the mirror and compass system may operate to enter a rapid compensating and aggressive calibration mode in response to a detection of an abrupt movement of the mirror head and compass sensor. The system may determine when such an abrupt movement is indicative of a mirror adjustment (such as an adjustment between the daytime and nighttime orientations for a prismatic mirror or an adjustment of the mirror by a person who has just entered the vehicle or started the vehicle ignition), and then may enter the aggressive calibration mode in response to such a determination. The system thus may discern, such as algorithmically via software and/or aided via a movement/mechanical adjust detector/sensor element, between a change in sensor output that is indicative of a mirror adjustment and a change in sensor output that is indicative of a change in vehicle direction and may enter the aggressive calibration mode when the change in sensor output is indicative of a mirror adjustment. Such a mirror adjustment typically occurs rapidly (such as in less than one second) and has a predictable range and/or direction, so that the compass system can discern when a change in sensor output is indicative of a mirror adjustment versus a detection of a magnetic field anomaly or the like or versus a change in directional heading of the vehicle.

According to another aspect of the present invention, an interior rearview mirror system for a vehicle includes an interior rearview mirror assembly, a casing having a reflective element, a compass sensor and a control. The casing is adjustable relative to a mounting structure that mounts the interior rearview mirror assembly to an interior portion of the vehicle. The compass sensor has a first magnetoresponsive sensing element and a second magnetoresponsive sensing element. The compass sensor is disposed within the mirror casing. The control receives a first signal indicative of a magnetic field sensed by the first magnetoresponsive sensing element and receives a second signal indicative of a magnetic field sensed by the second magnetoresponsive sensing element. The control determines a directional heading of the vehicle based on the first and second signals. The control automatically compensates for a deviating magnetic field of the vehicle and generates a signal indicative of the directional heading of the vehicle. The control determines that the casing is adjusted by an occupant of the vehicle in response to a change in the first and second signals being indicative of an abrupt movement of the casing about the mounting structure by an occupant of the vehicle (such as when the driver or occupant of the vehicle adjusts the mirror reflective element to provide a desired reflector rearward field of view). The control is operable to enter a rapid compensating mode to compensate for the mirror adjustment in response to the control determining that the casing is adjusted by an occupant of the vehicle.

According to another aspect of the present invention, an interior rearview mirror system for a vehicle includes an interior rearview mirror assembly, a casing having a reflective element, a compass sensor and a control. The casing is adjustable relative to a mounting structure that mounts the interior rearview mirror assembly to an interior portion of the vehicle. The compass sensor has a first magnetoresponsive sensing element and a second magnetoresponsive sensing element. The compass sensor is disposed within the mirror casing. The control receives a first signal indicative of a magnetic field sensed by the first magnetoresponsive sensing element and a second signal indicative of a magnetic field sensed by the second magnetoresponsive sensing element. The control determines a directional heading of the vehicle based on the first and second signals and automatically compensates for a deviating magnetic field of the vehicle and generates a signal indicative of the directional heading of the vehicle. The control is operable to enter a rapid compensating mode in response to an ignition cycle of the vehicle. The control automatically exits the rapid compensating mode and enters a less aggressive calibration mode that distinguishes the Earth's magnetic field from magnetic anomalies and non-abrupt changes in the vehicle magnetic signature. The control automatically exits the rapid compensating mode after a predetermined period of time has elapsed since the ignition cycle.

Therefore, the present invention provides a mirror and compass system that positions the compass sensor within the movable head portion of the mirror assembly. The compass sensor is positioned in a manner that reduces the effects of mirror adjustment on the sensor performance. The system may adjust processing in response to known movements of the mirror head to compensate for such known movements. The system may enter an aggressive calibration mode to calibrate the compass sensor when the mirror has been adjusted by a user. The compass system may distinguish between the anomaly signature or pattern and the mirror adjustment signature or pattern and may enter the calibration mode when the mirror adjustment is detected.

These and other objects, advantages, purposes and features of the present invention will become apparent upon review of the following specification in conjunction with the drawings.

BRIEF DESCRIPTION OF THE DRAWINGS

FIG. 6 is a sectional view of another interior rearview mirror assembly in accordance with the present invention.

DESCRIPTION OF THE PREFERRED EMBODIMENTS

Figure 1:
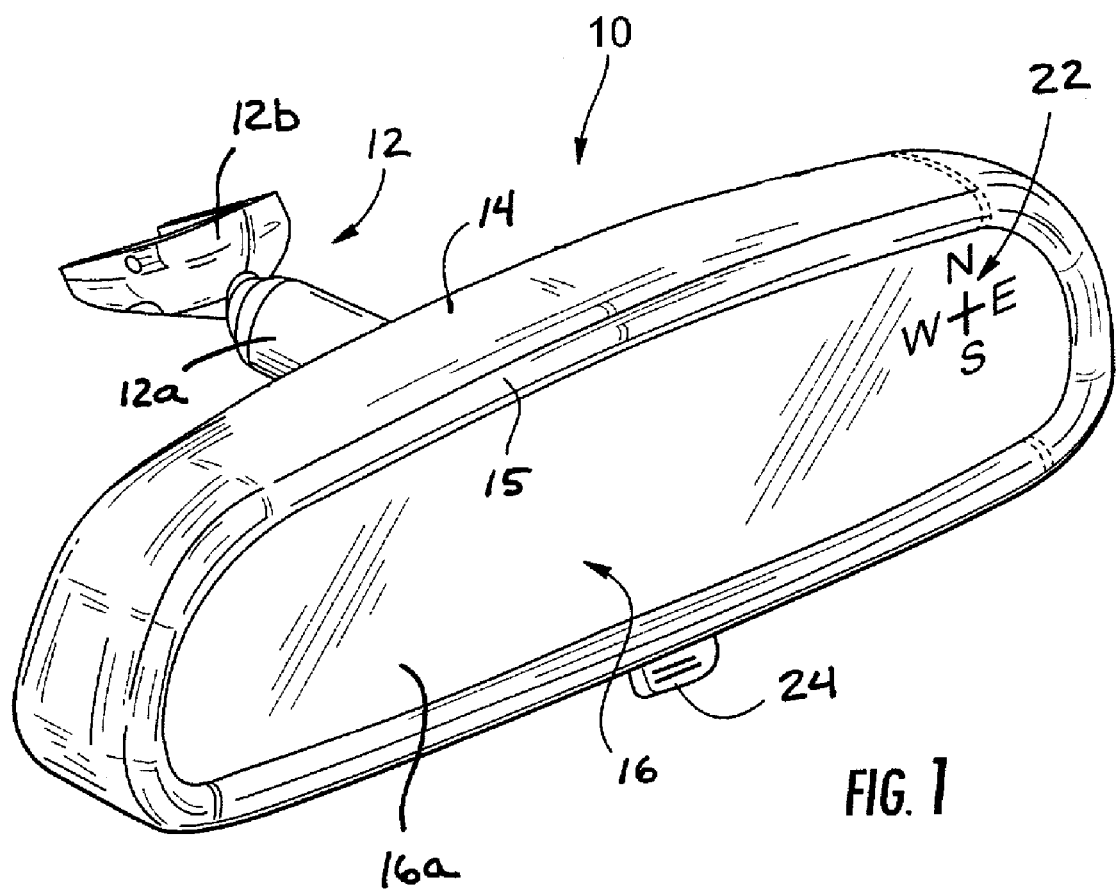
FIG. 1 is a forward facing elevation of an interior rearview mirror assembly in accordance with the present invention, as facing forward with respect to a direction of travel of a vehicle.
Figure 3:
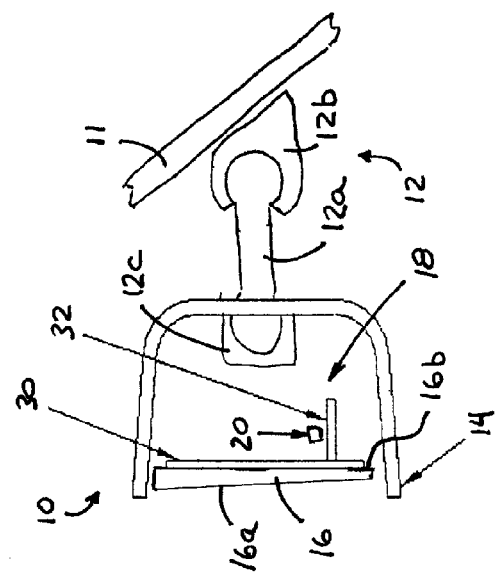
FIG. 3 is a sectional view of the interior rearview mirror assembly taken along the line III-III in FIG. 2.
Figure 2:
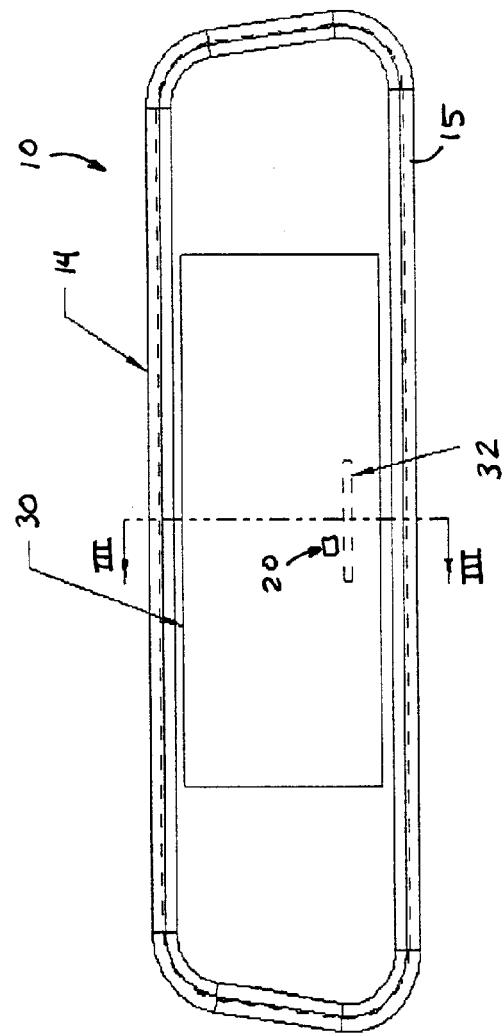
FIG. 2 is a forward facing elevation of a interior rearview mirror assembly of the present invention.

Referring now to the drawings and the illustrative embodiments depicted therein, a compassized prismatic interior rearview mirror assembly or system 10 includes a double pivot or double ball mounting arrangement 12 for pivotally or adjustably mounting a casing 14, bezel portion 15 and prismatic reflective element 16 of mirror assembly 10 relative to an interior portion of a vehicle, such as to an interior surface of a windshield 11 of a vehicle or the like (FIGS. 1-3). The mirror assembly 10 includes a compass system 18, which includes a magnetoresponsive compass sensor 20 and a display 22 for providing a display or indication of the directional heading of the vehicle, such as at the reflective element 16 of the mirror.

The mirror casing or housing 14 may comprise a polypropylene material or the like and is adjustably mounted to a mirror mount (not shown) positioned at an interior portion of a vehicle, such as a mirror mounting button on a windshield of the vehicle or any other mounting member at the windshield or at a headliner or overhead console of the vehicle or the like. The mirror housing may be adjustably mounted at the vehicle via connection to a single or double ball mounting arrangement, or via connection to any other mounting arrangement, without affecting the scope of the present invention. The mirror housing 14 may then pivot or actuate around one or more ball and socket joints or connections to be adjusted relative to the interior portion of the vehicle to a desired orientation by the driver of the vehicle.

As shown in FIGS. 1 and 3, the double ball or double pivot mirror mounting arrangement 12 includes a mounting arm 12a which is pivotally mounted at opposite ends to a mirror mount 12b (mounted at the windshield or headliner of the vehicle, such as at a mounting button at the interior surface of the vehicle) and a mirror casing mount 12c. Examples of double pivot or double ball mounting arrangements are described in commonly assigned U.S. Pat. Nos. 4,646,210 and 6,331,066, which are hereby incorporated herein by reference. Preferably, the mirror mounting components provide a breakaway type connection or mount, such as the types disclosed in U.S. Pat. Nos. 6,774,810; 6,642,851; 6,483,438; 6,366,213; 6,326,900; 6,222,460; 6,172,613; 6,087,953; 5,820,097; 5,377,949; and/or 5,330,149, which are hereby incorporated herein by reference. Optionally, the mirror assembly may incorporate a mounting arrangement of the types described in U.S. provisional applications Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004; and Ser. No. 60/729,430, filed Oct. 21, 2005 by Hook for MOUNTING ASSEMBLY FOR VEHICLE INTERIOR MIRROR; and/or PCT Application No. PCT/US04/015424, filed May 18, 2004 by Donnelly Corp. et al. for MIRROR ASSEMBLY FOR VEHICLE, and published on Dec. 2, 2004, as International Publication No. WO 2004/103772; and U.S. patent application Ser. No. 10/933,842, filed Sep. 3, 2004, now U.S. Pat. No. 7,249,860; and/or Ser. No. 11/226,628, filed Sep. 14, 2005, which are hereby incorporated by reference herein. Optionally, and as shown in FIGS. 3-5, the mounting arrangement may comprise a single ball mounting arrangement, without affecting the scope of the present invention.

In the illustrated embodiment, the reflective element 16 comprises a prismatic reflective element. The prismatic interior rearview mirror assembly may comprise any type of prismatic interior rearview mirror assembly, such as the types described in U.S. Pat. Nos. 6,318,870; 6,598,980; 5,327,288; 4,948,242; 4,826,289; 4,436,371; and 4,435,042; and PCT Application No. PCT/US2004/015424, filed May 18, 2004 by Donnelly Corporation et al. for MIRROR ASSEMBLY FOR VEHICLE, and published on Dec. 2, 2004, as International Publication No. WO 2004/103772; and U.S. patent application Ser. No. 10/933,842, filed Sep. 3, 2004 by Kulas et al. for INTERIOR REARVIEW MIRROR ASSEMBLY, now U.S. Pat. No. 7,249,860, which are hereby incorporated herein by reference. Optionally, the prismatic reflective element may comprise a conventional prismatic reflective element or prism or may comprise a prismatic reflective element of the types described in U.S. patent application Ser. No. 10/528,269, filed Mar. 17, 2005, now U.S. Pat. No. 7,274,501; Ser. No. 10/709,434, filed May 5, 2004 by Lynam for MIRROR REFLECTIVE ELEMENT, now U.S. Pat. No. 7,420,756; Ser. No. 10/933,842, filed Sep. 3, 2004 by Kulas et al. for INTERIOR REARVIEW MIRROR ASSEMBLY, now U.S. Pat. No. 7,249,860; Ser. No. 11/021,065, filed Dec. 23, 2004, now U.S. Pat. No. 7,255,451; and/or Ser. No. 10/993,302, filed Nov. 19, 2604 by Lynam for MIRROR REFLECTIVE ELEMENT FOR A VEHICLE, now U.S. Pat. No. 7,338,177; and/or PCT Application No. PCT/US03/29776, filed Sep. 19, 2003 by Donnelly Corp. et al, for MIRROR REFLECTIVE ELEMENT ASSEMBLY; and/or PCT Application No. PCT/US2004/015424, filed May 18, 2004 by Donnelly Corporation et al. for MIRROR ASSEMBLY FOR VEHICLE, and published on Dec. 2, 2004, as International Publication No. WO 2004/103772; and U.S. provisional application Ser. No. 60/525,952, filed Nov. 26, 2003 by Lynam for MIRROR REFLECTIVE ELEMENT FOR A VEHICLE, which are all hereby incorporated herein by reference, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (the entire disclosures of which are hereby incorporated by reference herein), that can benefit from the present invention.

The prismatic reflective element 16 may be formed from various materials such as plastic or glass, but preferably is glass, and preferably has a planar front surface 16a extending at an angle to a planar rear surface 16b (FIG. 3). Rear surface 16b is preferably coated with a reflective layer of metal such as chromium, aluminum or alloys thereof as is conventionally known in the industry. The mirror casing 14 is pivotable relative to mounting arm 12a and mirror mount 12b to pivot the reflective element 16 in order to reduce glare during nighttime conditions. When the mirror casing is pivoted (such as via adjustment or movement of a toggle tab or actuator 24) from a full reflectivity daytime position to a reduced reflectivity nighttime position, the reflective surface 16b is rotated or pivoted such that the uncoated front surface 16a of reflective element 16 is aligned for viewing by the vehicle driver instead of reflective surface 16b. Preferably, reflective surface 16b reflects at least about 60 percent to 95 percent of the light incident thereon, while the uncoated front surface 16a reflects about 4 percent of the light incident thereon, such that the reflective element significantly reduces glare from headlights or other bright lights rearward of the vehicle to the driver's eyes when pivoted to the nighttime position. Although shown and described as having a prismatic reflective element, it is envisioned that many aspects of the present invention may be equally suitable and applicable to electro-optic or electrochromic interior rearview mirror assemblies having electro-optic or electrochromic reflective elements, such as described below.

Figure 5:
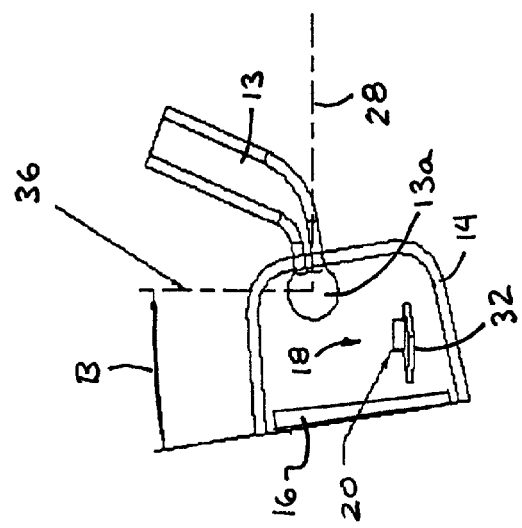
FIG. 5 is a sectional view of the interior rearview mirror assembly of FIG. 4.
Figure 4:
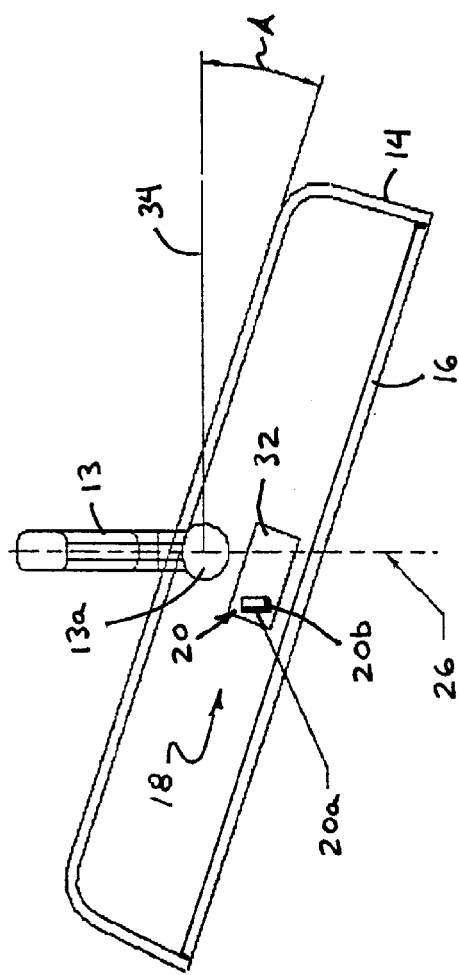
FIG. 4 is a top plan view of the interior rearview mirror assembly of the present invention.

As shown in FIGS. 4 and 5, when installed in the vehicle and adjusted for viewing by a typical sized driver, the reflective element 16 is angled approximately 20 to 22 degrees toward the driver side (from a longitudinal axis 26 of the vehicle) and approximately 9 degrees downward (from a generally horizontal plane 28) toward the floor of the vehicle. This is the nominal or typical position of the reflective element when set to the daytime orientation. When the toggle 24 is flipped to set the reflective element to the nighttime orientation, the mirror head (including the reflective element and casing and circuit board and circuitry) is pivoted about 4½ degrees or thereabouts upward or downward. Typically, prism flip angles range from about 3½ degrees to about 5 degrees, and most typically are about 4¼ to about 4½ degrees.

The compass sensor 20 of compass system 18 functions to detect a directional heading of the vehicle relative to the Earth's magnetic field, as is known in the art. The compass system and sensor may utilize aspects of the compass systems described in U.S. patent application Ser. No. 10/352,691, filed Jan. 28, 2003 by Schierbeek et al. for VEHICLE COMPASS COMPENSATION, now U.S. Pat. No. 6,922,902; Ser. No. 10/933,842, filed Sep. 3, 2004 by Kulas et al. for INTERIOR REARVIEW MIRROR ASSEMBLY, now U.S. Pat. No. 7,249,860; and/or Ser. No. 10/456,599, filed Jun. 6, 2003 by Weller et al. for INTERIOR REARVIEW MIRROR SYSTEM WITH COMPASS, now U.S. Pat. No. 7,004,593, and/or U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and 6,642,851, and/or PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772, and/or European patent application, published Oct. 11, 2000 under Publication No. EP 0 1043566, and/or Ser. No. 11/226,628, filed Sep. 14, 2005; U.S. provisional applications Ser. No. 60/624,091, filed Nov. 1, 2004 by Karner et al. for MOUNTING ASSEMBLY FOR MIRROR AND METHOD OF MAKING SAME; and/or Ser. No. 60/630,061, filed Nov. 22, 2004 by Lynam et al. for MIRROR ASSEMBLY WITH VIDEO DISPLAY, which are all hereby incorporated herein by reference. The compass circuitry may include the compass sensor, such as a magneto-responsive sensor, such as a magneto-resistive sensor, such as the types disclosed in U.S. Pat. Nos. 5,255,442; 5,632,092; 5,802,727; 6,173,501; 6,427,349; and 6,513,252 (which are hereby incorporated herein by reference), a magneto-capacitive sensor, a Hall-effect sensor, such as the types described in U.S. Pat. Nos. 6,278,271; 5,942,895 and 6,184,679 (which are hereby incorporated herein by reference), a magneto-inductive sensor, such as described in U.S. Pat. No. 5,878,370 (which is hereby incorporated herein by reference), a magneto-impedance sensor, such as the types described in PCT Publication No. WO 2004/076971 A2, published Sep. 10, 2004 (which is hereby incorporated herein by reference), or a flux-gate sensor or the like, and/or may comprise a compass chip, such as described in U.S. patent application Ser. No. 11/226,628, filed Sep. 14, 2005; and U.S. provisional applications Ser. No. 60/624,091, filed Nov. 1, 2004 by Karner et al. for MOUNTING ASSEMBLY FOR MIRROR AND METHOD OF MAKING SAME; and/or Ser. No. 60/630,061, filed Nov. 22, 2004 by Lynam et al. for MIRROR ASSEMBLY WITH VIDEO DISPLAY, which are hereby incorporated herein by reference.

The sensor circuitry and/or the circuitry in the mirror housing and associated with the compass sensor may include processing circuitry. For example, and as shown in FIGS. 1 and 2, compass system 18 may include a printed circuit board (PCB) 30, which may be mounted or positioned or bonded along the rear surface 16b of the reflective element 16. The printed circuit board 30 may include all of the processing circuitry and the compass sensor. The processing circuitry may include compensation methods, such as those described in U.S. Pat. Nos. 4,546,551; 5,699,044; 4,953,305; 5,255,442; 5,576,687; 5,632,092; 5,677,851; 5,708,410; 5,737,226; 5,802,727; 5,878,370; 6,087,953; 6,173,508; 6,222,460; 6,513,252; and 6,642,851, and U.S. patent application Ser. No. 10/352,691, filed Jan. 28, 2003 by Schierbeek et al. for VEHICLE COMPASS COMPENSATION, now U.S. Pat. No. 6,922,902; and Ser. No. 10/456,599, filed Jun. 6, 2003 by Weller et al. for INTERIOR REARVIEW MIRROR SYSTEM WITH COMPASS, now U.S. Pat. No. 7,004,593, and European patent application, published Oct. 11, 2000 under Publication No. EP 0 1043566, which are all hereby incorporated herein by reference. The compass sensor may be incorporated in or associated with a compass system and/or display system for displaying a directional heading of the vehicle to the driver, such as a compass system of the types described in U.S. Pat. Nos. 5,924,212; 4,862,594; 4,937,945; 5,131,154; 5,255,442; and/or 5,632,092, and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, and/or Ser. No. 11/284,543, filed Nov. 22, 2005 by DeWind et al. for INTERIOR MIRROR ASSEMBLY WITH DISPLAY, now U.S. Pat. No. 7,370,983, and/or PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772, and/or U.S. provisional applications Ser. No. 60/630,061, filed Nov. 22, 2004 by Lynam et al. for MIRROR ASSEMBLY WITH VIDEO DISPLAY; and/or Ser. No. 60/667,048, filed Mar. 31, 2005, which are all hereby incorporated herein by reference.

When an interior rearview mirror that includes a compass system (such as a known compass system) is first installed in a vehicle at a vehicle assembly plant (such as when the mirror assembly (including the compass sensor and circuitry) is attached to a mounting button at a vehicle windshield or other mounting portion at an interior portion of the vehicle) and first powered, known compass systems, which typically have the compass sensor fixedly mounted at the mirror foot or base or mount, include an initial calibration mode intended to allow the vehicle to be delivered from the assembly plant to an automobile dealership with the compass appropriately calibrated. Taking, for example, such a known interior mirror compass system currently supplied by the assignee to automakers, the compass system enters an aggressive calibration mode or rapid calibration/compensating mode (such as the Cal-1 mode as described in U.S. Pat. No. 6,513,252, and U.S. patent application Ser. No. 10/352,691, filed Jan. 28, 2003 by Schierbeek et al. for VEHICLE COMPASS COMPENSATION, now U.S. Pat. No. 6,922,902, which are hereby incorporated herein by reference) to calibrate the compass as the vehicle on the assembly line weaves and turns on the assembly conveyor line and as the vehicle is driven through the assembly plant and through the staging or storage lot and onto a truck for shipping to a dealer. In so doing, the assignee's compass system determines three cardinal points (other competitive compass systems require detection of all four cardinal (N, W, S, E) points) and then deduces the true directional heading of the vehicle, compensating for the magnetic deviation inherent in the vehicle. After the vehicle is shipped to a dealer and purchased, the compass system is calibrated and the correct heading is shown on the compass display typically provided at the mirror reflector or at the mirror bezel. After this initial Cal-1 or aggressive calibration has been completed, calibration and/or compensation for stray magnetic fields and other magnetic anomalies, such as typically encountered exterior the vehicle during driving (and from the likes of metal bridges, subway lines, cellular telephone towers, large metal structures and the like), are compensated for via other less aggressive calibration/compensation modes.

Thus, for example, and referring to U.S. Pat. No. 6,513,252 and U.S. patent application Ser. No. 10/352,691, filed Jan. 28, 2003 by Schierbeek et al. for VEHICLE COMPASS COMPENSATION, now U.S. Pat. No. 6,922,902, and/or Ser. No. 10/456,599, filed Jun. 6, 2003 by Weller et al. for INTERIOR REARVIEW MIRROR SYSTEM WITH COMPASS, now U.S. Pat. No. 7,004,593, which are hereby incorporated herein by reference, the compass system may initially operate in the aggressive Cal-1 calibration mode, and then may later function in a less aggressive calibration/compensation mode, such as Cal-2 or Cal-3 calibration modes.

Using the compass system of the present invention, as the vehicle is typically driven on highways (and with the compass system of the present invention in its normal operating mode or non-calibration mode), the compass system is exposed to and may be affected by the various magnetic anomalies, such as from bridges, cell towers, and/or the like referenced above. Such magnetic anomalies, however, have a particular, and often predictable, anomaly signature and/or pattern. The magnetic anomalies may impact the compass system performance and may lead to temporary inaccurate compass readings and/or an erroneous compensation of the compass system, and thus lead to display of erroneous/inaccurate compass display headings.

The compass system of the present invention includes an algorithm expressed in software processed by a microprocessor that includes a mirror adjust detection routine. This mirror adjust detection routine takes advantage of the fact that magnetic anomalies/stray magnetic fields, which emanate from structures typically external to the vehicle as it passes by such structures and objects along a road or highway, are typically temporary and relatively short lived because of the speed of passage of the vehicle. The mirror adjust detection routine further takes account of the fact that mirror adjustments by a driver of a vehicle are relatively predictable events that occur abruptly and that remain adjusted typically for the duration of that particular journey. Thus, the mirror adjust detection routine of the present invention algorithmically reduces or prevents or suppresses confusion of a mirror adjust event from other stray magnetic field/magnetic anomaly effects that are external to the vehicle. For example, the compass system of the present invention (via software operated by a microprocessor of the control of the compass system) may distinguish and/or learn the pattern and signature of such stray magnetic fields/magnetic anomalies and may ignore such and/or avoid entering particular calibration mode or modes or portions of modes when such anomalies are detected and recognized/distinguished by the compass system.

Optionally, the compass sensing device or sensor 20 may comprise a two-axis sensor (comprising two magneto-responsive sensing elements disposed at a fixed angle relative to each other, such as orthogonally to each other, and disposed on a platform or circuit board or substrate 32 so that they are positioned generally parallel to the floor plane of the vehicle so as to be sensitive to the horizontal component of the Earth's magnetic field), or the sensor may comprise a three-axis sensor (comprising two magneto-responsive sensing elements disposed orthogonally to each other and disposed in the mirror casing cavity, and a third magneto-responsive sensing element, sometimes referred to as a z-axis sensing element, at a right angle (approximately ninety degrees) to the two sensing elements and disposed in the cavity, so that the three-axis sensor is sensitive to the horizontal component and to the vertical component of the Earth's magnetic field), without affecting the scope of the present invention. The third axis sensing element is an optional and not necessary addition to the sensor of the compass system of the present invention. However, the z-axis sensing element may be helpful in detecting and distinguishing magnetic anomalies exterior to the vehicle (as discussed above), but is not needed for the primary compass direction determination and/or the detection of a tilt or rotation of the mirror. The compass sensor may be arranged at a desired angle to provide enhanced sensing in the horizontal directions when the mirror assembly is installed in the vehicle, as discussed below.

In the illustrated embodiment of FIGS. 4 and 5, the compass sensor 20 includes a pair of sensing elements 20a, 20b positioned generally orthogonal to one another. The pair of generally orthogonal sensing elements are preferably oriented relative to the vehicle such that one of the sensing elements (20a) is generally parallel to the floor of the vehicle and pointing generally forwardly in the direction of travel of the vehicle, while the other sensing element (20b) is generally orthogonal or perpendicular to the first sensing element and preferably also generally parallel to the floor of the vehicle. The compass sensor provides an output signal to compass processing circuitry, which is operable to process the output signal to determine the vehicle heading and to actuate or control or adjust an output of the display in response to the output signal.

Optionally, and desirably, the compass sensor may be positioned at a compass sensor board or substrate 32 that may extend generally horizontally from the printed circuit board 30 at the rear of the reflective element 16. The compass sensor 20 may comprise a pair of generally orthogonal sensing elements and thus may provide a two axis sensing ability and function to provide direction sensing throughout the range of mirror adjustment with reduced or minimal impact on the accuracy of the directional sensing during such adjustment. The impact may be further reduced by various mounting arrangements or configurations and algorithms and the like, as discussed below.

As shown in FIGS. 2 and 4, the compass sensor is desirably positioned generally centrally from side to side within the mirror assembly, such as along a centerline of the mirror assembly or along the longitudinal axis 26, in order to reduce or minimize the affects or angular impact of the mirror adjustments on the compass sensor output. The compass sensor is also desirably positioned at or near a lower region of the circuit board and mirror assembly, so as to be positioned further from the upper sheet metal or roof of the vehicle and further from the overhead wiring or lighting, or other devices or systems that may provide dynamic magnetic disturbances, for enhanced performance of the compass sensor.

One of the sensing elements 20a of the compass sensor 20 is preferably oriented generally along or parallel to the longitudinal axis 26 of the vehicle and the other sensing element 20b is preferably oriented along or generally parallel to a lateral or cross-car axis 34 of the vehicle (in a side to side orientation and generally parallel to the vehicle floor), with the sensing elements being generally normal or at a right angle to one another. Optionally, and as shown in FIG. 4, the compass sensing elements 20a, 20b may be oriented relative to the mirror reflective element so that the sensing element 20a is generally parallel to the longitudinal axis 26 of the vehicle, while the other sensing element 20b is generally parallel to the lateral or cross-car axis 34 of the vehicle when the reflective element is angled or oriented at the typical viewing position. The orthogonally oriented compass sensing elements 20a, 20b are thus positioned at their optimal angle for the typical setting or position or orientation of the mirror assembly during typical use of the mirror assembly in the vehicle.

For example, and as shown in FIGS. 4 and 5, the reflective element is typically rotatably angled horizontally and sidewardly toward the driver at an angle A, which is typically about 20 degrees (for a typical driver) relative to the cross car axis, and the reflective element is typically tiltably angled vertically and downwardly at an angle B, which is typically about 9 degrees (for a typical driver) relative to a vertical plane 36. Because the mirror casing and reflective element may be pivoted to be angled generally toward the head of the driver of the vehicle, such as, for example, rotatably angled approximately 17-25 degrees toward the driver side of the vehicle and tiltably angled approximately 6 to 12 degrees downward, the compassized interior rearview mirror assembly of the present invention thus may be adapted to mount the compass sensor on a physical mount or tilt/rotation offset element at the printed circuit board which compensates for or approximates and effectively cancels the approximate angle of the mirror casing so as to orient the compass sensor generally in the desired orientation, even when the mirror casing and reflective element are angled toward the driver of the vehicle (such as described in U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which is hereby incorporated herein by reference).

For example, a printed circuit board or equivalent may be positioned at and attached to the rear surface of the reflective element (the surface within the casing of the mirror assembly and facing away from the driver of the vehicle when the mirror assembly is installed in the vehicle), such as via adhesive or an attachment or backing plate or the like. The circuit board may comprise a generally flat, rectangular element or substrate with conductive traces and circuitry disposed thereon. When the mirror head and reflective element are arranged so that the reflective surface (the flat rear surface) of the reflective element is generally vertical, the circuit board is also generally vertically oriented. Where a compass sensor chip (which may include a pair of orthogonally oriented sensing elements arranged in a common plane) is disposed on and along the substrate or circuit board (PCB), the chip itself (and hence the sensing elements disposed therein) may be placed on the PCB in any orientation chosen by the PCB manufacturer. Thus, the compass sensor chip may be oriented such that the principal axis of one sensor is generally horizontal and toward a side of the vehicle, while the principal axis of the other sensor may be generally vertically oriented when the PCB is attached to a reflective element and the reflective element is generally vertically oriented. Thus, the actual placement of the compass chip itself thus may largely or substantially-take care of or account for the rotational orientation of the mirror head.

Because it is desired to provide sensing in the x-y directions (or in a horizontal plane), the compass sensor is preferably disposed on a compass sensor mount or board that extends at an angle from the circuit board and/or rear surface of the reflective element so that the compass sensor elements are generally horizontal when the mirror assembly is installed in the vehicle at its nominal (such as about 20 degree sideward and 9 degree downward) orientation. Preferably, the compass sensor mount is mounted to the circuit board such that the compass sensor mount is oriented at about a 9 degree downward angle from being perpendicular or normal to the circuit board, such that the compass sensor mount or chip is substantially horizontal relative to the floor of the vehicle and thus with the ground when the mirror head and reflective element are oriented at the typical or nominal orientation with about a 9 degree downward tilt toward the typical driver's head location. Likewise, the compass sensor is preferably mounted to the compass sensor mount at an angle so that the principal axes of the compass sensing elements are at a desired respective angle relative to the reflective element. For example, a first one of the sensing elements may be at an angle of about 20 degrees toward the driver side of the mirror assembly relative to the longitudinal axis of the vehicle, while a second sensing element may be generally orthogonal to the first sensing element and along the plane of the compass sensor mount. Thus, when the mirror head and reflective element are oriented at the typical or nominal orientation with about a 9 degree downward tilt and about a 20 degree sideward rotation toward the typical driver's head location, the sensing elements are oriented along a generally horizontal plane and are oriented such that the principal axis of the first sensing element is in the direction of travel of the vehicle, while the principal axis of the second sensing element is normal to the first principal axis and directed toward the side of the vehicle. The compass sensor mount may be mounted to the printed circuit board and/or the reflective element via a generally wedge-shaped mounting element or offset element (or via other mounting means) or the compass sensor itself may be attached to or mounted to the printed circuit board at the desired angle, such as via other mounting attachment means, to provide the desired orientation of the compass sensor relative to the reflective element. It is further envisioned that the tilt/rotation offset element may be otherwise formed (or the compass sensor may be otherwise mounted to the circuit board) to provide other offset angles depending on the particular application of the mirror assembly and the nominal orientation of the reflective element that directs the reflective element generally toward the location of a typical driver to provide the typical driver with the appropriate or desired field of view rearward and through the rear window of the vehicle.

Thus, by using the tilt/rotation offset element of the present invention, typically a plastic molding that, for example, attaches to the rear of the reflective element, an angled shelf or ledge is created upon which rests the compass sensor itself and/or its printed circuit board (PCB). Thus, when the interior rearview mirror assembly is installed in a vehicle, such as at the assembly plant (and adjusted at a generally nominal position for viewing by a driver, such that the algorithm can take over and generally or substantially calibrate the compass system as the vehicle is moved through the vehicle assembly plant), and/or is used by the average or typical driver, the tilt/rotation offset element compensates for the nominal 20 degree sideward rotation/9 degree downward tilt, such that the magneto-responsive sensing elements are oriented in the vehicle in which the mirror assembly is mounted with the principal axis of a first one of the magnetoresponsive sensing elements pointing directly forward through the windshield in the direction of travel of the vehicle, and with the principal axis of a second magnetoresponsive sensing element at 90 degrees relative thereto and pointed sidewardly toward a side of the vehicle, and with both the first and second principal axes/magnetoresponsive sensing elements lying in the same plane, and with that plane being generally horizontal with the floor of the vehicle and thus with the road being traveled. Thus, the tilt/rotation offset element and/or the physical tilt and rotation offset means (that may be tied to or separate from the offset element and/or sensor mount) of the present invention physically ensures that the compass sensor has at least two magnetoresponsive sensing elements oriented generally horizontal to the ground (with one facing forward of the vehicle and one facing orthogonally sideward). Thus, at the nominal (about 20 degree sideward/9 degree downward) mirror orientation or setting, the compass sensor is oriented in a known orientation relative to the Earth's horizontal magnetic field. The mirror adjust detection algorithm or routine of the present invention may reference against this as a base or reference orientation from which mirror/sensor adjustment is estimated and/or accommodated/compensated against.

Optionally, in order to reduce the affect of mirror adjustment on the compass sensor, the compass sensor may be mounted or positioned in close proximity to the mirror ball (the ball (referred to at 13a in FIG. 5) that is pivotally received at the mirror casing or toggle element of the mirror assembly). Optionally, the compass sensor may be fixedly positioned relative to the mirror ball (or may be mounted at the end of the mounting arm and mirror ball) so that there is reduced or little or no movement of the compass sensor during minor adjustments of the reflective element, such as when the reflective element is toggled or flipped between the daytime and nighttime orientations. For example, and as shown in FIG. 6, the compass sensor may be disposed on a circuit board or platform 32' that is attached to a portion of the mirror ball 13a' of the mounting arm 13', such as at a lower portion of the ball (to position the sensors remote from the roof of the vehicle). An electrical connector or wire or lead 38 may connect the compass sensor to the circuitry and display elements at the circuit board 30' at the reflective element 16. As shown in FIG. 5, the mounting arm 13' is part of a single ball mounting arrangement, but may be a mounting arm of a double ball mounting arrangement, such as the type shown in FIGS. 1 and 3, without affecting the scope of the present invention.

Optionally, and as described in U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which is hereby incorporated herein by reference, the printed circuit board 30 may be mounted at a physical mount at the reflective element to accommodate the approximate angle of the mirror casing. The physical mount may be a wedge shaped mounting element or bracket or any other means for orienting the compass sensor relative to the reflective element to accommodate for the typical angle of tilt of the mirror head toward a driver of a vehicle. The typical angle or tilt of the mirror head or casing may be calculated or otherwise determined or approximated and the physical mount may then be formed to compensate or cancel the typical angle of the mirror. The desired mounting orientation may vary depending on the particular vehicle in which the compassized mirror assembly is being installed, since the mirror assembly may be mounted at different heights along the windshield or at the headliner of different vehicle models. In lieu of a physical orientation as described above, software compensation, as known in the art, can be used to negate or cancel out the above effects.

Optionally, in applications where illumination sources or lights or any other electrically conducting/powered electrical accessory or the like may be sufficiently close to the compass sensor such that operation of the lights may impact the compass performance (due to the magnetic field generated by the current going through the lights), the lights may be controlled or modulated via a pulse width modulation (PWM) control, so that the lights are modulated between "on" and "off" settings by the PWM control. The PWM control may be optimized to minimize emissions and to maintain vehicle lighting requirements. The compass algorithm or control or microprocessor may monitor the PWM control and may enter a different operation mode when the lights are being PWM controlled. For example, the compass control may optimize the hardware for through put and may synchronize the light's PWM "off" time with the data collection by the compass sensors, in order to reduce or minimize the impact of the field generated by the current passing through the wires when the lights are on or energized. Preferably, the lighting requirements may be maintained while allowing sufficient time for the compass system signals to settle after the PWM signal for the light is shut down or off. The preferred or desirable settings may be selected based on a compromise between the emission of the illumination source or sources and the ability to successfully read the compass sensor signals or output at the desired accuracy.

As described above, adjustment of the mirror housing (that includes the mirror reflective element) about its pivot connection to its support (typically a double-ball support arm as described above, although a single-ball support arm can also be used, without affecting the scope of the present invention) to the windshield (or to a header region at the joint of the windshield and the roof of the interior cabin of the vehicle) can cause the compass direction sensing sensor attached to the rear of the mirror reflective element to also move. Thus, the compass control circuitry may detect a change in sensed compass directional signal (for example, about 3 degrees to about 8 degrees or thereabouts) when the mirror is adjusted by a driver of the vehicle. Should the vehicle be heading in a direction that is close to half-way between one octant or another in an eight-octant resolving compass display system, this adjustment by the driver of the mirror housing to set the rearward field of view of the mirror reflective element to suit that driver's needs/preference (typically occurring when the driver starts the journey) may cause the heading displayed to the driver to change from, for example, NW to N, because the adjustment by the driver of the mirror housing has changed the orientation/alignment of the magnetic field detecting elements of the compass sensor (for example, a magnetoresistive sensor or Hall effect sensor) relative to the Earth's magnetic field. Modern automatic automotive compass control systems, such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and 6,513,252, U.S. patent application Ser. No. 10/352,691, filed Jan. 28, 2003 by Schierbeek et al. for VEHICLE COMPASS COMPENSATION, now U.S. Pat. No. 6,922,902, and European patent application, published Oct. 11, 2000 under Publication No. EP 0 1043566, which are all hereby incorporated herein by reference, comprise processing circuitry that includes compensation methods that correct for such changes in sensed compass heading. Thus, and as indicated in U.S. Pat. No. 6,642,851, which is hereby incorporated herein by reference, such known compensation methods can be used to recalibrate the compass mirror system of the present invention after adjustment of the mirror housing by the driver.

Techniques and methods for compensating for such adjustments, such as suggested in U.S. Pat. No. 6,418,376 (the entire disclosure of which is hereby incorporated herein by reference), may be used in conjunction with the present invention. Such methods use a position sensor (such as a tilt sensor) that determines displacement of the mirror housing with respect to a generally horizontal plane. For example, the compass system of the present invention may incorporate a tilt sensor or position sensor or rotation sensor or sensing means or element (such as a tilt sensor, a clinometer or a protractor or the like) that is operable to detect the position or orientation or movement of the mirror and compass sensors relative to a generally horizontal plane and/or a generally vertical plane. For example, the compass system may incorporate an electronic tilt sensor or clinometer, such as the types commercially available from various sources, such as, for example, from Schaevitz® Sensors of Hampton, Va., such as an AccuStar® electronic clinometer or the like, and which may have a have a resolution of about 0.001 degrees and a range of about 60 degrees or thereabouts, and that may provide an analog, ratiometric, digital pulse width, or serial output. Optionally, for example, the compass system may incorporate an electrolytic tilt sensor, which includes electrically conductive fluid that remains substantially level as the sensor body is tilted, whereby the conductivity between a pair of electrodes within the sensor body is proportional to the length or amount of the electrode immersed in the conductive fluid, such that the degree of tilt may be determined. Such electrolytic tilt sensors are commercially available from various sources and may provide accurate pitch and roll measurements and enhanced repeatability, stability, and accuracy when operating at low frequencies. For example, a dual-axis, or 5-pin, sensor may be packaged in a cylindrical vial that stands between about ½ inch to about 1 inch high, and that provides an operating range of tilt from about ±10 degrees to about ±75 degrees. Optionally, the compass system may incorporate an AMR (anisotropic magnetoresistive) magnetic field sensor or the like, which may provide a tilt detection/determination. Other tilt sensors, clinometers, protractors, electrolytic sensors and/or the like may be implemented with the compass system, without affecting the scope of the present invention.

Optionally, the mirror ball and/or mirror socket may include a transducer/sensor that may determine the orientation of the mirror ball relative to the mirror socket. As the ball rotates in the socket (such as due to adjustment of the mirror head/reflective element by the driver), the orientation of the ball relative to the socket is detected and transmitted or communicated to the control/microprocessor of the compass system. The compass system may then determine the angular adjustment and may adjust the sensor processing and/or compensate for the angular change in response to the detected angular change in the position/orientation of the mirror head relative to the ball of the mounting arm.

The control or circuitry or microprocessor may adjust the degree of compensation of the compass sensor output in response to the output or outputs of the position sensor/sensors. Optionally, other techniques, such as the techniques and methods described in U.S. Pat. Nos. 6,140,933 and 6,023,229, which are hereby incorporated herein by reference, may also or otherwise be implemented.

Optionally, a magnetic field emitter or radiator or generator may be placed in a known fixed location within the vehicle interior cabin (for example, the magnetic field emitter may be placed as part of the mirror foot or mount or base that fixedly attaches to the mirror mounting button or may be otherwise fixedly positioned relative to the vehicle). The magnetic field emitter may optionally be operated to emit a magnetic field in a pulsed and/or coded magnetic field signature. The magnetic field signature/signal emitted by the fixed magnetic field emitter or source will be picked up by the x-y orthogonally oriented magnetoresponsive sensing elements of the compass sensor (that are positioned within the movable mirror head and that move with the mirror head as it is pivoted about its single or double ball joint support), and thus that move relative to the fixed magnetic field emitter. Because the physical location of the fixed magnetic field emitter is known, the emitter can function as a homing beacon for the movable head/sensing elements, and thus a triangulation algorithm or the like can be used to determine the particular orientation of the sensing elements and any deviation from a known orientation. The compass sensor thus may detect the emitted magnetic field (such as when the emitter is pulsed) and the control or circuitry or microprocessor may process the compass sensor output (such as the output signal that corresponds to when the emitter is pulsed) to discern or distinguish the pulsed magnetic field or signature magnetic field as emitted by the fixed magnetic field emitter to determine the orientation of the mirror head and compass sensor relative to the fixed magnetic field emitter, and thus to determine the degree of adjustment of the mirror head or reflective element relative to the mounting base or known initial orientation or the like. The control may then adjust or alter the directional heading signal and/or the display output in response to the detection of a change in orientation or position of the mirror head relative to the fixed reference point.

Optionally, an algorithmic technique may be implemented whereby, when an abrupt change in detected heading is detected that is characteristic of an adjustment of the mirror housing by the driver of the vehicle, the automatic compass circuitry changes its calibration status from its ongoing state (that compensates for such heading changes over a prolonged period, and one that typically may span an ignition cycle of the vehicle or several vehicle ignition cycles) to a more aggressive, faster calibration stage (such as a Cal-1 or Cal-2 calibration mode as described in U.S. Pat. No. 6,513,252 and U.S. patent application Ser. No. 10/352,691, filed Jan. 28, 2003 by Schierbeek et al. for VEHICLE COMPASS COMPENSATION, now U.S. Pat. No. 6,922,902, which are hereby incorporated herein by reference) that more rapidly, and preferably within that same ignition cycle, recalibrates the compass system and so compensates for the driver's adjustment of the mirror housing/casing and for the concomitant movement of the compass sensor housed therein.

Thus, for example, when a change in compass heading is detected that is indicative of and characteristic of an adjustment of the mirror housing by the driver, such as to adjust the mirror to provide a desired rearward field of view (such adjustment causes an abnormal change of the compass output that is different, such as by magnitude and/or rate of change, than what would occur during normal driving), then the calibration changes to a faster or rapid or more aggressive compensation/calibration algorithm/method. Such mirror adjustments are typically within the range of plus or minus about 2 to 4 degrees upward or downward from the nominal downward angle (of about 9 degrees downward) of the mirror head/reflective element, and plus or minus about 3 to 5 degrees to either side from the nominal sideward angle (of about 20 degrees toward the driver side) of the mirror head/reflective element. Such mirror adjustments, which typically occur rapidly, such as within less than about one to two seconds or thereabouts, create their own known and predictable signature or pattern and thus may be detected and discerned by the compass system. Thus, and referring to U.S. Pat. No. 6,513,252 and U.S. patent application Ser. No. 10/352,691, filed Jan. 28, 2003 by Schierbeek et al. for VEHICLE COMPASS COMPENSATION, now U.S. Pat. No. 6,922,902, and/or Ser. No. 10/456,599, filed Jun. 6, 2003 by Weller et al. for INTERIOR REARVIEW MIRROR SYSTEM WITH COMPASS, now U.S. Pat. No. 7,004,593, which are hereby incorporated herein by reference, upon detection of a change in compass heading that is indicative of and characteristic of an adjustment of the mirror housing by the driver, the calibration of the compass system would reinitiate back from Cal-3 (or Cal-2) to the beginning of Cal-1. Note that a mechanical element such as a mechanical movement detector can be used to detect adjustment by the driver of the mirror housing, and the recalibration can be initiated in response to a signal output of such a mechanical element.

Desirably, if a mirror adjustment is detected that is beyond the normal range or zone of adjustment of the mirror (such as may occur if the passenger angles the mirror toward the passenger side to borrow the mirror or the mirror is otherwise rotated away from the driver, or such as may occur if the mirror is inadvertently hit or moved to a severely adjusted condition such that no reasonable driver would reasonably view rearwardly through the rear window with the mirror so adjusted), the compass system may detect and discern such egregious or non-normal movement/adjustment and may suspend the calibration activities because such movement/adjustment is an abnormal and typically temporary condition. The compass system may return to its normal and/or calibration mode of operation when the mirror head/reflective element is returned to within the normal range of angular adjustment/position/orientation, such as within a predetermined degree upward/downward and sideward of the nominal position/orientation.

For example, the compass compensation or calibration process may provide for initialization of a rapid or aggressive calibration stage in response to movement of the mirror housing by the driver grasping and moving the mirror head/reflective element to adjust to his or her preferred field of view rearward through the rear window of the vehicle. The compass circuitry may be operable to detect and discern or distinguish a change in the sensed heading which is characteristic of an adjustment of the mirror housing by a driver of the vehicle. The compass circuitry then may respond by reinitializing the compass calibration to the rapid or aggressive calibration stage or mode. The compass circuitry then may compensate for the movement of the compass sensor caused by the adjustment of the mirror housing via a microprocessor-based algorithm/software. After completion of the rapid calibration stage, such as after the compass sensor is re-calibrated or after a predetermined amount of time following the onset of the rapid or aggressive calibration stage, the compass circuitry may return to its normal operation.

Optionally, the compass circuitry/software can set or return to the beginning of the aggressive calibration stage (such as to the beginning of Cal-1 as described above) each time the mirror compass circuitry is initially powered, such as by a fresh ignition cycle of the vehicle. Thus, for example, should a driver or occupant of the vehicle adjust the interior rearview mirror orientation during the immediately previous ignition cycle, and thus potentially disturb the established proper compass calibration, then an aggressive and rapid recalibration may automatically occur at the start of the following or next ignition cycle (and thus any potential calibration misalignment may only be temporarily experienced by the driver). Optionally, such an aggressive recalibration may occur in response to actuation of a key fob or remote keyless entry device or remote starter device or the like.

Optionally, the degree of aggression of the rapid calibration stage may be effected by the time elapsed between the ignition activation (or actuation of the key fob or remote keyless entry device or the like) and the perceived or detected adjustment of the mirror. For example, if the circuitry detects an abrupt adjustment of the sensor orientation within a threshold time after the ignition is activated, then the control may determine that the change in orientation is due to a mirror adjustment (such as may occur when the driver first enters the vehicle and before or soon after shifting into drive or reverse) and thus may enter the rapid and aggressive calibration mode. Optionally, the microprocessor or control may include a first start protocol that causes the compass system to enter the aggressive calibration mode in response to the first ever startup of the vehicle ignition, such as typically occurs at the vehicle assembly plant.

Optionally, the compass system may acquire directional heading data at the activation of the ignition (or activation of a key fob or the like) and, if an adjustment of the mirror head is detected soon after such activation, the compass system may acquire heading data with the sensors at the new orientation. Because the initial heading data sampled after the ignition cycle may be correct data or may be indicative of the vehicle heading, the compass system may compensate or adjust the new data to account for the change in orientation of the compass sensor from the initial and adjusted position. The compass system thus may algorithmically adjust the compass heading or sensor processing to account for the perceived movement or adjustment of the mirror head without entering the aggressive calibration mode.

Optionally, the degree of aggression or entry into the rapid aggressive calibration mode may be affected by the speed of the vehicle when the change in orientation of the compass sensors is detected. For example, if an abrupt change in the orientation of the sensors is detected when the vehicle is stopped or moving at or below a threshold speed (such as at or below about 10 mph or thereabouts), the control may determine that the abrupt change may be due to an adjustment of the mirror head or reflective element, and thus may enter the rapid and aggressive calibration mode. Alternately, if the vehicle speed is detected (such as via a wheel speed sensor or the like) to be above a threshold speed (such as at or above about 60 mph or thereabouts), any change in the sensed direction may be determined to be a change in vehicle direction, since it is not likely that a driver would typically adjust the mirror position while driving at highway speeds.

Thus, when a mirror adjustment is detected that is within the expected range and/or time so as to be indicative of an adjustment of the mirror head/reflective element by the driver of the vehicle to adjust his or her field of view rearward through the rear window of the vehicle, the compass system of the present invention may enter the aggressive calibration mode and begin looking for cardinal directional headings (such as North, South, East or West), such as three or more of the cardinal directional points. The compass system may distinguish between deviations or signatures or patterns that are indicative of anomalies and signatures or patterns that are indicative of normal mirror adjustments by the driver and may enter the calibration mode when a mirror adjustment is detected.

The compass system may remain in the aggressive calibration mode for an aggressive calibration period. The aggressive calibration period may continue until, for example, the three cardinal points or more or less are detected so that the compass system is again considered recalibrated. Optionally, and desirably, the aggressive calibration period may terminate even if the compass system has not yet sensed three or more cardinal points, such as after a predetermined or threshold period of time has elapsed since detection of the adjustment, or after the ignition cycle is terminated or the ignition is turned off, and before detection of the third cardinal point, so that the compass system does not remain in the aggressive calibration mode for an excessive period of time. Because it is possible that the compass system may pick up an anomaly during the aggressive calibration mode (such as, for example, if the compass system detects the true North and West cardinal points, but detects an anomaly and erroneously considers the anomaly to be the East cardinal point), and thus may use the false signal and result in a premature exit of the calibration mode and an erroneous directional heading indication, it is desirable that the compass system return to the aggressive calibration mode at the onset of each ignition cycle, and/or the next ignition cycle following the detection of the mirror adjustment and aggressive calibration mode. Desirably, the compass system may initiate the aggressive calibration mode at the onset of each ignition cycle, and the compass system may remain in the aggressive calibration mode until three cardinal points (or more or less as desired) are detected or for a predetermined period of time following the ignition activation or when the ignition cycle is terminated.

Optionally, if an abrupt change upward or downward (or pivoting about a generally horizontal axis) is detected, the control circuitry may determine that such an adjustment is indicative of toggling or flipping the mirror reflective element between the daytime and nighttime orientations, and may account for the 4½ degree (or thereabouts, depending on the particular mirror application) change or adjustment via software compensation. Preferably, in such an embodiment, the nominal condition or orientation of the compass sensor is met when the mirror reflective element is at the daytime position or orientation. The determination of the downward or upward movement of the mirror assembly may be made irrespective of the vehicle speed, since such an adjustment (the flipping or toggling of the reflective element between the daytime and nighttime positions) may often occur while the driver is driving the vehicle at higher speeds.

The compass display 22 may provide a display region at the reflective element 16 which includes ports or portions, which may comprise icons, characters or letters or the like representative of only the cardinal directional points, such as, for example, the characters N, S, E, W, formed or etched in the reflective film coating of the reflective element (and forming a transparent window therein), such as via techniques such as disclosed in commonly assigned U.S. Pat. No. 4,882,565, issued to Gallmeyer on Nov. 21, 1989, and such as described in Ser. No. 10/456,599, filed Jun. 6, 2003 by Weller et al. for INTERIOR REARVIEW MIRROR SYSTEM WITH COMPASS, now U.S. Pat. No. 7,004,593. Optionally, however, reflective element may comprise a transflective or display on demand (DOD) reflective element, and the compass display may be a display on demand (DOD) type of display, such as disclosed in commonly assigned U.S. Pat. Nos. 6,690,268; 5,668,663 and 5,724,187, and U.S. patent application Ser. No. 10/054,633, filed Jan. 22, 2002 by Lynam et al. for VEHICULAR LIGHTING SYSTEM, now U.S. Pat. No. 7,195,381, the entire disclosures of which are hereby incorporated by reference herein, without affecting the scope of the present invention.

The display may include a plurality of illumination sources, such as light emitting diodes and such as blue light emitting diodes, such as an OSRAM LBT673-M2N2-35 light emitting p diode or the like, which are operable to illuminate one or more ports or regions or appropriate F characters or letters (or through the transflective DOD reflective element) to indicate the direction in which the vehicle is driving, such as described in Ser. No. 10/456,599, filed Jun. 6, 2003 by Weller et al. for INTERIOR REARVIEW MIRROR SYSTEM WITH COMPASS, now U.S. Pat. No. 7,004,593. The display ports or characters of the display may include only the four cardinal directional points (such as, for example, the characters N, S, E, W) formed or etched in the reflective film coating of the reflective element (and forming a transparent window therein), or may include eight directional points, such as the four cardinal directional points and the four inter-cardinal points (such as, for example, the characters N, NE, E, SE, S, SW, W, NW), without affecting the scope of the present invention.

The reflective element 16 may also include a port or aperture or hole in the center area or region of the display area (or, as discussed above, may comprise a transflective or DOD reflective element) to accommodate a photo detector or sensor (not shown), such as a photo transistor, a photo resistor, a photo diode or the like, which may be operable to sense the ambient light levels surrounding the mirror assembly or the light from headlights of vehicles rearward of the subject vehicle. The photosensor may be positioned or mounted on the printed circuit board and may be positioned, aligned and directed to receive illumination through the aperture or hole in the reflective element coating at the display region or elsewhere on the reflective element or the casing (such as through an opening formed in a wall of the casing immediately adjacent to the location of the photosensor). The photosensor may detect the ambient light levels generally surrounding the mirror assembly to provide for dimming of the output of the display in darkened lighting conditions, such as at nighttime conditions, in order to reduce the intensity of the display to reduce glare and distraction and annoyance to the driver of the vehicle. Optionally, such dimming of the display may be performed in response to an instrument panel dimming system of the vehicle, without affecting the scope of the present invention.

Optionally, the magnetoresponsive compass sensor or circuitry responsive to the Earth's magnetic field may be operable in conjunction with the global positioning system of the vehicle to provide directional heading data to the global positioning system, such as disclosed in U.S. patent application Ser. No. 10/422,378, filed Apr. 24, 2003 by Schofield for IMAGING SYSTEM FOR VEHICLE, now U.S. Pat. No. 6,946,978, and/or Ser. No, 10/456,599, filed Jun. 6, 2003 by Weller et al. for INTERIOR REARVIEW MIRROR SYSTEM WITH COMPASS, now U.S. Pat. No. 7,004,593, which are hereby incorporated herein by reference. The compass sensor circuitry may provide such directional heading data to assist the global positioning system in maintaining tracking of the location of the vehicle, such as between waypoints or the like, when the satellite signal to the global positioning system is interrupted, such as may occur in cities between tall buildings (often referred to as "urban canyons") or the like. Other vehicle movement data may also be provided, such as vehicle speed data or vehicle odometer data or the like, to further assist in determining and tracking the location of the vehicle in situations where the satellite communication to the global positioning system of the vehicle may be temporarily interrupted or compromised. Optionally, an imaging system (such as described in U.S. patent application Ser. No. 10/422, 378, filed Apr. 24, 2003 by Schofield for IMAGING SYSTEM FOR VEHICLE, now U.S. Pat. No. 6,946,978, which is hereby incorporated herein by reference) may be used to further assist in determining and tracking the location of the vehicle in situations where the satellite communication to the global positioning system may be temporarily interrupted or compromised.

Optionally, the printed circuit board of the compass or mirror system (such as a printed circuit board of a compass module or pod or a printed circuit board of the mirror assembly) of the present invention may include another display element along or partially along an edge of the board and may include one or more user-actuatable controls or buttons near or adjacent to the display element. The display element may be any type of display, such as a vacuum fluorescent (VF) display, a light emitting diode (LED) display, an electroluminescent (EL) display, a liquid crystal display (LCD), a video screen display or the like, and may be operable to display various information (as discrete characters, icons or the like, or in a multi-pixel manner) to the driver of the vehicle, such as passenger side inflatable restraint (PSIR) information, tire pressure status, and/or the like. The buttons may be for actuating or controlling various accessories or controls or components associated with the vehicle, such as for a compass calibration setting or zone setting, a telematics actuation, a garage door opener, an electronic toll control (such as disclosed in U.S. Pat. No. 6,690,268, which is hereby incorporated herein by reference), and/or other accessories or systems or functions or the like, or may be for switching the display between various functions or modes, without affecting the scope of the present invention. The mirror casing may include appropriate openings, such that the display element is visible through one opening, while the buttons or controls may partially protrude through other corresponding openings when an appropriate circuit board is installed within the mirror casing.

Figure 7:
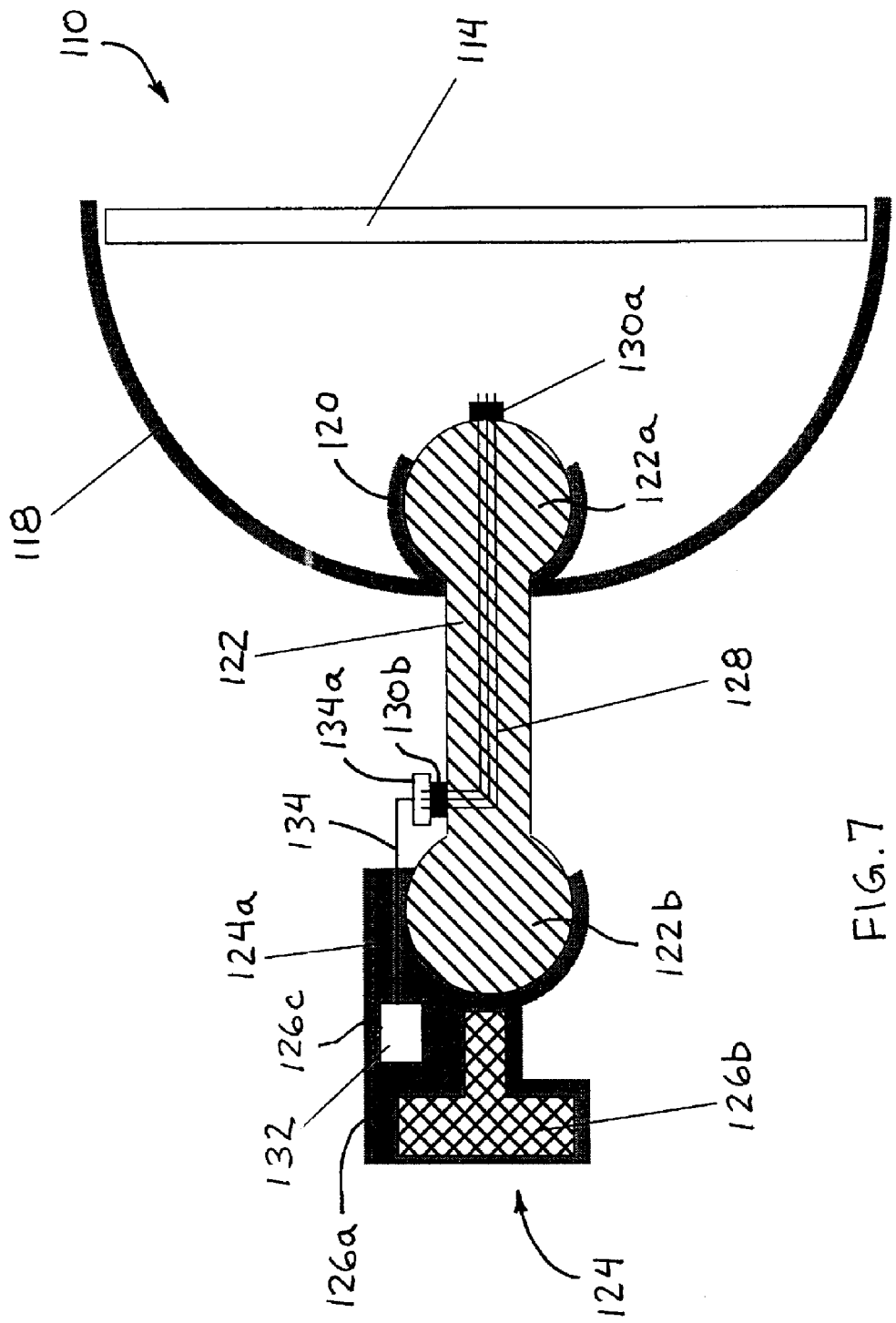
FIG. 7 is a sectional view of another interior rearview mirror assembly and mounting assembly in accordance with the present invention.

Optionally, the mirror assembly and/or a mounting base of the mirror mounting assembly may include or incorporate an electrical accessory or element or circuitry that may be electrically connected to a corresponding electrical accessory or element or circuitry within the mirror casing. For example, and with reference to FIG. 7, a mirror assembly 110 may include an essentially all-polymeric or plastic mounting assembly 112 having a mounting base 124 that houses or contains an electrical element or circuitry or sensor 132, such as a compass sensor, such as a magneto-responsive sensor, such as a magneto-resistive sensor, a magneto-capacitive sensor, a magneto-inductive sensor, a flux-gate sensor or a Hall-effect sensor or the like. The sensor 132 may be positioned at and within the molded base portion 126a so that the sensor is substantially fixedly positioned within the vehicle when the mounting base is attached to the mounting button or structure of the vehicle, such as described in U.S. patent application Ser. No. 11/226,628, filed Sep. 14, 2005, which is hereby incorporated herein by reference. The sensor 132 may include a lead or wire or wires 134 with a connector 134a, such as a multi-pin plug or socket or the like, at an end thereof for connecting to a corresponding connector or plug or socket 130b of electrical conductors 130 of support arm 122. The support arm 122 and electrical conductors 128, connectors 130a, 130b, mirror housing or casing 118 and socket 120 of mirror assembly 110 may utilize aspects of the mirror assemblies described in U.S. patent application Ser. No. 11/226,628, filed Sep. 14, 2005, which are hereby incorporated herein by reference.

Mounting base 124 may be molded or formed to define the base portion 126a and a socket portion 124a for receiving ball member 122b of support arm 122. The base portion 126a may be molded over and at least partially around a metallic insert 126b. Base portion 126a may be molded or formed with a cavity 126c and/or passageway for receiving the sensor or wire, or may be overmolded over and at least partially around the sensor and/or wire. The wire 134 comprises a flying lead or flexible lead that extends from the base portion 126a to the connector or terminals at the support arm 122, and includes sufficient slack or flexibility to accommodate pivotal movement or articulation of the support arm relative to the socket 124a of mounting base 124. The other connector 130a (at ball member 122a received in socket 120 (which may be formed at the casing or at a toggle member or attachment or back plate of the mirror)) may connect to a corresponding connector at a circuit board or electrical element or the like at the mirror casing, such as to circuitry on a circuit board at the reflective element or the like. The electrical element at or in the mirror casing may include controls or display circuitry and elements that are associated with or incorporated in a compass system and/or display system of the mirror assembly.

The accessory or sensor (or other electrical component or circuitry) thus may be positioned or located at or within the plastic molded mounting base of the mirror assembly. The accessory thus is positioned generally along the longitudinal axis of the mounting arm, and generally between the ball member 122b and the mounting base/mounting button at the windshield when the mirror assembly is installed in a vehicle, and not substantially above or below the mounting base (such as in a pod or gondola or module located above or below the mirror assembly) such as is typically done in known mirror assemblies. By positioning the accessory generally along the longitudinal axis of the support arm or generally along the z-axis (the axis along the vehicle and normal to the cross car or x-axis and the vertical or y-axis), the accessory is located generally between the windshield and the mirror casing and reflective element when the mirror assembly is installed in the vehicle, and does not extend substantially above or below or to either side of the mirror when the mirror assembly is installed in the vehicle. The mounting base thus may house or contain the accessory in a location that does not interfere with the forward field of view of the driver of the vehicle. The mirror assembly of the present invention thus may provide a fixed sensor with double ball movement or articulation, and with reduced interference with the forward field of view by the driver of the vehicle.

Optionally, the electrical accessory or circuitry housed or contained within the mounting base may comprise a compass sensor that is part of a compass system and/or display of the mirror assembly and/or vehicle. Note that the magneto-responsive sensor used with the mirror assembly may comprise a magneto-responsive sensor, such as a magneto-resistive sensor such as the types disclosed in U.S. Pat. Nos. 5,255,442; 5,632,092; 5,802,727; 6,173,501; 6,427,349; and 6,513,252 (which are hereby incorporated herein by reference), or a magneto-inductive sensor, such as described in U.S. Pat. No. 5,878,370 (which is hereby incorporated herein by reference), or a magneto-impedance sensor, such as the types described in PCT Publication No. WO 2004/076971 A2, published Sep. 10, 2004 (which is hereby incorporated herein by reference), or a Hall-effect sensor, such as the types described in U.S. Pat. Nos. 6,278,271; 5,942,895 and 6,184,679 (which are hereby incorporated herein by reference). The sensor circuitry and/or the circuitry in the mirror housing and associated with the sensor may include processing circuitry. For example, a printed circuit board may include processing circuitry which may include compensation methods such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and 6,642,851, which are all hereby incorporated herein by reference. The compass sensor may be incorporated in or associated with a compass system and/or display system for displaying a directional heading of the vehicle to the driver, such as a compass system of the types described in U.S. Pat. Nos. 5,924,212; 4,862,594; 4,937,945; 5,131,154; 5,255,442; and/or 5,632,092, and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; and/or Ser. No. 11/029,695, filed Jan. 5, 2005 by Lindahl et al. for MIRROR ASSEMBLY, now U.S. Pat. No. 7,253,723, and/or PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772, and/or U.S. provisional application Ser. No. 60/636,931, filed Dec. 17, 2004, which are all hereby incorporated herein by reference.

Optionally, the sensor may comprise a two-axis sensor (comprising two magneto-responsive sensor elements disposed at a fixed angle relative to each other, such as, preferably, orthogonally to each other, and disposed in the cavity 126c generally parallel to the floor plane of the vehicle so as to be sensitive to the horizontal component of the Earth's magnetic field), or the sensor may comprise a three-axis sensor (comprising two magneto-responsive sensor elements disposed orthogonally to each other and disposed in the cavity, and a third magneto-responsive sensor element at a right angle (approximately ninety degrees) to the two sensor elements and disposed in the cavity, so that the three-axis sensor is sensitive to the horizontal component and to the vertical component of the Earth's magnetic field), without affecting the scope of the present invention. The sensor may be arranged at a desired angle to provide enhanced sensing in the horizontal directions when the mirror assembly is installed in the vehicle. For example, aspects of constructions such as are disclosed in U.S. Pat. Nos. 6,140,933 and 6,928,366, which are hereby incorporated herein by reference, may be utilized.

Optionally, an integrated automotive "compass-on-a-chip" may be disposed in the cavity of the mounting base and may comprise at least two magneto-responsive sensor elements (preferably Hall effect sensors established on the semiconductor substrate, preferably a silicon substrate, in the same VLSI chip/circuitry manufacturing process, using chip manufacturing processing means as known in the ASIC art), associated A/D and D/A converters, associated microprocessor(s) and memory, associated signal processing and filtering, associated display driver and associated LIN/CAN BUS interface and the like, all (or a sub-set thereof) created or disposed onto a semiconductor substrate, such as a silicon substrate (such as using CMOS technology), and constituting an ASIC chip, which is small (preferably less than approximately a two square centimeter area, more preferably less than approximately a 1.5 square centimeter area, and most preferably less than approximately a one square centimeter area or thereabouts) and readily packagable into the cavity. Thus, power (such as 12 volts or thereabouts, such as from the vehicle power source or the like) may be supplied to the ASIC chip and the ASIC chip may include all or substantially all of the circuitry for operation when the power source is connected to the ASIC chip.

Optionally, and preferably, such a compass-on-a-chip ASIC may also include the hardware and software required to receive an output from a temperature sensor (such as a thermocouple or thermostat that is located external the vehicle cabin in order to sense and monitor the temperature external to the vehicle) and to convert this signal to a reading in degrees Fahrenheit or Celsius, and to provide this reading via an on-chip temperature display driver and/or via a BUS protocol or via an on-chip wireless transmitter or the like to a digital or other type of temperature display so that the driver and/or occupants of the vehicle can view the temperature being measured (such as the temperature external the vehicle and/or the temperature within the vehicle cabin). Thus, for example, a monolithic compass/temp-on-a-chip ASIC may be disposed in the likes of a mirror mount or within the mirror head/housing of an interior rearview mirror assembly, and it may provide both the external temperature readout and a compass direction heading readout to an information display at the mirror head/housing (or elsewhere in the vehicle, such as the instrument panel/cluster or at an overhead console or accessory module or the like). Optionally, such a chip or circuit board or circuitry may also or otherwise comprise EC driver circuitry for controlling/driving an electro-optic or electrochromic reflective element or cell, such as by utilizing aspects of the EC driver-on-a-chip such as described in U.S. patent application Ser. No. 11/201,661, filed Aug. 11, 2005 by DeWard et al. for ACCESSORY MODULE FOR VEHICLE, now U.S. Pat. No. 7,480,149, which is hereby incorporated herein by reference.

Optionally, the compass ASIC chip and/or compass sensor may be disposed at or in an exterior rearview mirror assembly of the vehicle (which typically utilizes a plastic housing). Such a location may locate the compass chip and compass sensor outside of the magnetic anomalies of the vehicle and at a location where the compass sensor may be less susceptible to or less effected by the windshield wipers of the vehicle or other accessories or metal of the vehicle. Optionally, and regardless of whether the compass chip is located behind the mirror reflector element or at the mirror mount or at an exterior mirror assembly of the vehicle or elsewhere in the vehicle, the display associated with the compass chip may be located at the reflector element or elsewhere in the vehicle, such as at the mirror mount or at an accessory module or windshield electronics module or console or the like of the vehicle.

Optionally, the printed circuit board, or the mirror assembly (or the compass module or an accessory module associated with the mirror assembly), may include other accessories, such as an image sensor (such as a video camera, such as a CMOS imaging array sensor, a CCD sensor or the like, such as the types of imaging sensors or cameras disclosed in commonly assigned, U.S. Pat. Nos. 5,550,677; 6,097,023 and 5,796,094, and/or PCT Application No. PCT/US2003/036177, filed Nov. 14, 2003 by Donnelly Corp. for IMAGING SYSTEM FOR VEHICLE, which are hereby incorporated herein by reference), a temperature sensor (such as a contact temperature sensor for measuring the temperature at or of the windshield), an antenna, or any other sensor or device. For example, the mirror assembly may include a forward facing video image sensor or system, which may include or may be associated with an intelligent rain sensor (such as the types disclosed in commonly assigned U.S. Pat. Nos. 6,320,176; 6,353,392 and 6,313,454, which are hereby incorporated herein by reference), an image or vision system (including an imaging sensor, such as a video camera, such as a CMOS imaging array sensor, a CCD sensor or the like, such as the types disclosed in commonly assigned, U.S. Pat. Nos. 5,550,677; 6,097,023 and 5,796,094, and U.S. patent application Ser. No. 10/422,378, filed Apr. 24, 2003 by Schofield for IMAGING SYSTEM FOR VEHICLE, now U.S. Pat. No. 6,946,978, which are hereby incorporated herein by reference), such as an imaging or object detection system or back up aid of the types described in U.S. Pat. Nos. 6,757,109; 6,717,610; 6,590,719; 6,201,642; 5,929,786; and/or 5,786,772, and/or U.S. patent application Ser. No. 10/427,051, filed Apr. 30, 2003 by Pawlicki et al. for OBJECT DETECTION SYSTEM FOR VEHICLE, now U.S. Pat. No. 7,038,577; and/or Ser. No. 11/239,980, filed Sep. 30, 2005 by Camilleri et al. for VISION SYSTEM FOR VEHICLE, and/or U.S. provisional applications Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; and/or Ser. No. 60/618,686, filed Oct. 14, 2004 by Laubinger for VEHICLE IMAGING SYSTEM, which are hereby incorporated herein by reference, or an intelligent headlamp controller (such as the types described in U.S. Pat. Nos. 5,796,094; 5,715,093; and/or 6,824,281, and/or in U.S. patent application Ser. No. 10/958,087, filed Oct. 4, 2004 by Schofield et al. for VEHICLE ACCESSORY MODULE, now U.S. Pat. No. 7,188,963, and/or U.S. patent application Ser. No. 11/105,757, filed Apr. 14, 2005, now U.S. Pat. No. 7,526,103; and U.S. provisional applications Ser. No. 60/607,963, filed Sep. 8, 2004 by Schofield for IMAGING SYSTEM FOR VEHICLE; and Ser. No. 60/562,480, filed Apr. 15, 2004 by Schofield for IMAGING SYSTEM FOR VEHICLE, which are hereby incorporated herein by reference), or an intelligent lane departure warning system (such as the types described in U.S. patent application Ser. No. 10/209,173, filed Jul. 31, 2001 by Schofield for AUTOMOTIVE LANE CHANGE AID, now U.S. Pat. No. 6,882,287; and/or Ser. No. 10/427, 051, filed Apr. 30, 2003 by Pawlicki et al. for OBJECT DETECTION SYSTEM FOR VEHICLE, now U.S. Pat. No. 7,038,577, which are hereby incorporated herein by reference), or indicator/display for a blind spot indicator or object detection system, such as the types described in U.S. provisional application Ser. No. 60/696,953, filed Jul. 6, 2005; and U.S. patent application Ser. No. 11/226,628, filed Sep. 14, 2005, which are hereby incorporated herein by reference, and/or the like. In applications where the mirror assembly includes or is associated with an automatic headlamp control system, it is envisioned that the display of the mirror system may include or provide a high beam/low beam indicator (such as an icon or indicia indicative of the high beams being activated, such as a blue headlamp indicia or the like) to indicate the status of the high beams of the vehicle to the driver or occupant of the vehicle.

Optionally, the mirror assembly or compass or accessory or electronic module of the present invention may include one or more displays, such as a text display, an icon display, a display on demand (DOD) type display (such as may be implemented with a transflective reflective element, such as described in U.S. Pat. Nos. 5,668,663; 5,724,187; and 6,690,268, the entire disclosures of which are hereby incorporated by reference herein), such as a video or touch screen interface display, or a video display screen, such as the types described in PCT Application No. PCT/US03/40611, filed Dec. 19, 2003 by Donnelly Corp. et al. for ACCESSORY SYSTEM FOR VEHICLE, and/or U.S. patent application Ser. No. 11/284, 543, filed Nov. 22, 2005, now U.S. Pat. No. 7,370,983, and/or U.S. provisional applications Ser. No. 60/630,061, filed Nov. 22, 2004 by Lynam et al. for MIRROR ASSEMBLY WITH VIDEO DISPLAY; and Ser. No. 60/667,048, filed Mar. 31, 2005, which are hereby incorporated herein by reference, or the like, and/or one or more sensors or other accessories, such as a biometric imager, such as for fingerprint authentication or the like, an infrared sensor, such as a zonal temperature sensor, such as suitable for an auto climate control, a forward facing image sensor, such as described above, a rearward facing image sensor (such as for biometric imaging (such as for face recognition, iris recognition or the like), seat height or position detection, drowsiness detection, safety/restraints object detection and position, emergency response image capture system, intrusion detection or the like), an electromagnetic field sensor (such as the type disclosed in commonly assigned U.S. Pat. No. 6,768,420, which is hereby incorporated herein by reference).

Optionally, and for a mirror assembly having a slideout or extendable/retractable display, such as a video slideout display or the like (such as the types described in PCT Application No. PCT/US03/40611, filed Dec. 19, 2003 by Donnelly Corp. et al. for ACCESSORY SYSTEM FOR VEHICLE, and/or U.S. patent application Ser. No. 11/284,543, filed Nov. 22, 2005, now U.S. Pat. No. 7,370,983, and/or U.S. provisional applications Ser. No. 60/630,061, filed Nov. 22, 2004 by Lynam et al. for MIRROR ASSEMBLY WITH VIDEO DISPLAY; and Ser. No. 60/667,048, filed Mar. 31, 2005, which are hereby incorporated herein by reference), the display may be operable or activatable when in its retracted or partially retracted position so as to provide display information, such as directional heading information or temperature information or other vehicle information or the like, that is viewable through the reflective element when the display is at least partially retracted. As described in the above referenced applications, such a slideout display is extended to display information to the driver of the vehicle and may be retracted when such information is not being displayed. When retracted, the display typically is deactivated and located behind the mirror reflector. In such a retracted or partially retracted position, the display element or screen is positioned at least partially at the rear of the mirror reflector element with the display element or screen facing the rear surface of the mirror reflector element.

It is thus envisioned that the display element (such as a video display element or LCD element or the like) may be activated when it is retracted or at least partially retracted, so that the display information or illumination emitted by the display element may be projected through the transflective mirror reflector element for viewing at the mirror reflector element. For example, and for mirror assemblies having a transflective mirror reflector element, the opaque backing of the reflector element may have a window or aperture or display area formed therethrough so that at least a portion of the display element, when activated in its retracted or partially retracted position, is viewable through the transflective mirror reflector at the display area.

In such an embodiment, it is desirable that there be a close or substantial optical coupling between the front surface of the display element or screen (the surface facing generally toward the driver of the vehicle when the mirror assembly is mounted in the vehicle) and the rear surface of the mirror reflector element (the surface facing generally away from the driver of the vehicle when the mirror assembly is mounted in the vehicle). Preferably, the mirror assembly may include an opaquifying or shading cover or baffle element that covers the display area when the slideout display is extended or at least partially extended and not activated to provide display information at the display area. For example, an opaque shading element may move over the window area at the rear of the mirror reflector element to cover/shade/opaquify the window/display area so that the internal components of the mirror assembly are not viewable through the window/display area when the display element is moved at least partially toward its extended position.

Thus, for example, a video slideout interior rearview mirror assembly can be provided that, when the driver selects reverse gear, a back lit TFT LCD screen may extend at the passenger side to display an image of a scene occurring immediately to the rear of the vehicle (such as captured by a rear mounted camera) so that the driver may view the image during a reversing maneuver to assist in reversing the vehicle. Preferably, such a display may include a graphic overlay or other indicia or the like, such as described in U.S. patent application Ser. No. 11/284,543, filed Nov. 22, 2005, now U.S. Pat. No. 7,370,983, to assist the driver in making the reversing maneuver. Upon the disengagement of the reverse gear by the driver, the display slides in or retracts to its stowed position. When the driver is driving the vehicle forward along a road, a compass display is viewable to the driver when he or she looks at the mirror. The compass display may be derived from a compass-on-a-chip sensor that is preferably mounted within a mirror mount or alternatively within the mirror casing or elsewhere in the vehicle. The compass display at the mirror reflector or reflective element (such as a transflective electrochromic reflective element or a transflective prismatic reflective element or the like) is provided by the same TFT LCD display screen or display element that is now stowed behind the reflective element and is seen through the transflective reflective element. Thus, the utility and user appreciation of the slideout display is enhanced because, when the vehicle is reversing, the display can slideout or extend to show the reversing scene and, when the display is stowed, such as during normal driving conditions, the same display element is used to provide an information display at the mirror reflector.

The display and/or accessories may be associated with a communication system, a speaker, a telematics module (which may include a GPS module, a wireless communication module, an human/machine interface (HMI), a display, such as an LED display, a dot matrix display, an alpha numeric display, a video display or the like, and/or a microphone, which may be operable for speech or voice recognition, noise reduction or noise cancellation), a humidity sensor, a remote keyless entry sensor, a tire pressure monitoring system (TPMS), an electronic toll collection sensor, an intelligent headlamp control, user interface controls (such as buttons, switches or the like for controlling various accessories of the vehicle, such as a sunroof, a communication system, lamps, security systems, displays or the like) or any other accessories, sensors, lights, indicators, displays or the like which may be suitable for mounting or positioning at or within the interior rearview mirror assembly or accessory module. The interior rearview mirror assembly and/or compass or accessory module may also provide for glare reduction characteristics of the reflective element of the rearview mirror assembly.

Optionally, the mirror assembly of the present invention may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, transmitters and/or receivers, such as a garage door opener or the like, a digital network, such as described in U.S. Pat. No. 5,798,575, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897; and/or PCT Application No. PCT/US03/40611, filed Dec. 19, 2003 by Donnelly Corp. et al. for ACCESSORY SYSTEM FOR VEHICLE, and/or U.S. patent application Ser. No. 11/284,543, filed Nov. 22, 2005, now U.S. Pat. No. 7,370,983, and/or U.S. provisional applications Ser. No. 60/630,061, filed Nov. 22, 2004 by Lynam et al. for MIRROR ASSEMBLY WITH VIDEO DISPLAY; and Ser. No. 60/667,048, filed Mar. 31, 2005, a remote keyless entry receiver or system or circuitry and/or a universal garage door opening system or circuitry (such as the types disclosed in U.S. Pat. Nos. 6,396,408; 6,362,771; 5,798,688 and 5,479,155, and/or U.S. patent application Ser. No. 10/770,736, filed Feb. 3, 2004 by Baumgardner et al. for GARAGE DOOR OPENING SYSTEM FOR VEHICLE, now U.S. Pat. No. 7,023,322), a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application Ser. No. 10/054,633, filed Jan. 22, 2002 by Lynam et al. for VEHICULAR LIGHTING SYSTEM, now U.S. Pat. No. 7,195,381, microphones, such as disclosed in U.S. Pat. Nos. 6,243,003; 6,278,377; and/or 6,420,975; and/or PCT Application No. PCT/US03/30877, filed Oct. 1, 2003, speakers, a tire pressure monitoring system, such as the types disclosed in U.S. Pat. Nos. 6,294,989; 6,445,287; and/or 6,472,979, and/or U.S. patent application Ser. No. 11/232,324, filed Sep. 21, 2005, now U.S. Pat. No. 7,423,522, and U.S. provisional application Ser. No. 60/611,796, filed Sep. 21, 2004 by O'Brien for TIRE PRESSURE ALERT SYSTEM, a navigation system, such as described in U.S. Pat. No. 6,477,464, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/287,178, filed Nov. 4, 2002 by McCarthy et al. for NAVIGATION SYSTEM FOR A VEHICLE, now U.S. Pat. No. 6,678,614; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 by Donnelly Corp. et al. for ACCESSORY SYSTEM FOR VEHICLE, a seat occupancy detector, a vehicle occupancy detector, such as the types described in U.S. Pat. No. 6,768,420 and/or PCT Application No. PCT/US05/42504, filed Nov. 22, 2005 by Donnelly Corp. et al. for OCCUPANT DETECTION SYSTEM FOR VEHICLE; and/or U.S. provisional application Ser. No, 60/630,364, filed Nov. 22, 2004 by Wåhlström for OCCUPANT DETECTION SYSTEM FOR VEHICLE, a trip computer, an ONSTAR® system and/or the like (with all of the above-referenced patents and patent applications and PCT applications and provisional applications being commonly assigned to Donnelly Corp., and with the disclosures of the referenced patents and patent applications and PCT applications and provisional applications being hereby incorporated herein by reference in their entireties). The accessory or accessories may be positioned at or within the mirror casing and may be included on or integrated in a printed circuit board positioned within the mirror casing, such as along a rear surface of the reflective element or elsewhere within a cavity defined by the casing, without affecting the scope of the present invention.

The interior rearview mirror assembly and/or an associated accessory module may also include user interface controls, such as buttons, switches or the like, displays, indicators, microphones, speakers or the like. Some of these may be provided at or along a display or interface area at or above the mirror. Optionally, the mirror assembly may include a user actuatable input or inputs to activate or deactivate or adjust one or more accessories of the mirror assembly or accessory module or console or of the vehicle. The inputs may be positioned at the mirror casing or bezel portion of the mirror assembly where they may be readily accessible by the driver or occupant of the vehicle. The inputs may comprise push buttons or the like or touch sensitive elements or sensors or proximity sensors or the like that may be selectively touched or depressed or approached to activate/deactivate/adjust the accessory or accessories, as discussed below. The inputs may utilize aspects such as those described in PCT Application No. PCT/US2003/036177, filed Nov. 14, 2003 by Donnelly Corp. for IMAGING SYSTEM FOR VEHICLE and/or PCT Application No. PCT/US04/015424, filed May 18, 2004 by Donnelly Corp. et al. for MIRROR ASSEMBLY FOR VEHICLE, published Dec. 2, 2004 as PCT Publication No. WO 2004/103772 A2, which are hereby incorporated herein by reference, or may utilize aspects of touch sensitive elements of the types described in U.S. Pat. Nos. 5,594,222; 6,001,486; 6,310,611; 6,320,282; and 6,627,918, and U.S. patent application Ser. No. 09/817,874, filed Mar. 26, 2001 by Quist et al. for INTERACTIVE AUTOMOTIVE REARVISION SYSTEM, now U.S. Pat. No. 7,224,324, which are hereby incorporated herein by reference, or may comprise proximity sensors of the types described in U.S. Pat. Publication No. 2002/0044065, published Apr. 18, 2002 by Quist et al. for INTERACTIVE AUTOMOTIVE REARVISION SYSTEM, now U.S. Pat. No. 7,224,324; and/or U.S. patent application Ser. No. 11/284,543, filed Nov. 22, 2005, now U.S. Pat. No. 7,370,983; Ser. No. 10/933,842, filed Sep. 3, 2004, now U.S. Pat. No. 7,249,860; and/or Ser. No. 10/956,749, filed Oct. 1, 2004, now U.S. Pat. No. 7,446,924; and/or PCT Application No. PCT/US03/40611, filed Dec. 19, 2003 by Donnelly Corp. et al. for ACCESSORY SYSTEM FOR VEHICLE, and/or U.S. provisional applications Ser. No. 60/630,061, filed Nov. 22, 2004 by Lynam et al. for MIRROR ASSEMBLY WITH VIDEO DISPLAY; and Ser. No. 60/667,048, filed Mar. 31, 2005, which are hereby incorporated herein by reference, or may comprise inputs molded within the bezel of the mirror assembly, such as described in U.S. patent application Ser. No. 11/029,695, filed Jan. 5, 2005, now U.S. Pat. No. 7,253,723, and U.S. provisional applications Ser. No. 60/535,559, filed Jan. 9, 2004 by Lindahl for MIRROR ASSEMBLY; and Ser. No. 60/553,517, filed Mar. 16, 2004 by Lindahl et al. for MIRROR ASSEMBLY, which are hereby incorporated herein by reference, or may comprise membrane type switches, such as described in U.S. patent application Ser. No. 11/140,396, filed May 27, 2005, now U.S. Pat. No. 7,360,932, and U.S. provisional applications Ser. No. 60/575,904, filed Jun. 1, 2004 by Uken for MIRROR ASSEMBLY FOR VEHICLE; and/or Ser. No. 60/624,320, filed Nov. 2, 2004 by Uken for MIRROR ASSEMBLY FOR VEHICLE, which are hereby incorporated herein by reference, or other types of switches or buttons or inputs, such as, for example, inputs of the types described in U.S. provisional applications Ser. No. 60/719,482, filed Sep. 22, 2005; and Ser. No. 60/690,401, filed Jun. 14, 2005, which are hereby incorporated herein by reference, and/or the like, without affecting the scope of the present invention.

The accessory or accessories may be positioned at or within the mirror casing and may be included on or integrated in the printed circuit board positioned within the mirror casing, such as along a rear surface of the reflective element or elsewhere within a cavity defined by the casing, without affecting the scope of the present invention. The user actuatable inputs described above may be actuatable to control and/or adjust the accessories of the mirror assembly/system and/or an overhead console and/or an accessory module/windshield electronics module and/or the vehicle. The connection or link between the controls and the systems or accessories may be provided via vehicle electronic or communication systems and the like, and may be connected via various protocols or nodes, such as Bluetooth™, SCP, UBP, J1850, CAN J2284, Fire Wire 1394, MOST, LIN, FlexRay™, Byte Flight and/or the like, or other vehicle-based or in-vehicle communication links or systems (such as WJFI and/or IRDA) and/or the like, depending on the particular application of the mirror/accessory system and the vehicle. Optionally, the connections or links may be provided via wireless connectivity or links, such as via a wireless communication network or system, such as described in U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which is hereby incorporated herein by reference, without affecting the scope of the present invention.

Optionally, the interior rearview mirror assembly or an associated accessory module or windshield electronics module or console may include a network bus, such as a CAN bus or a LIN bus, such as disclosed in U.S. Pat. No. 6,291,905, which is hereby incorporated herein by reference. The network bus may be operable to communicate with other systems of the vehicle, such as with accessories or elements of an accessory module, such as an accessory module of the type disclosed in commonly assigned U.S. Pat. Nos. 6,824,281; 6,243,003; 6,278,377 and 6,420,975; U.S. patent application Ser. No. 10/054,633, filed Jan. 22, 2002 by Lynam et al. for VEHICULAR LIGHTING SYSTEM, now U.S. Pat. No. 7,195,381; U.S. patent application Ser. No. 10/958,087, filed Oct. 4, 2004 by Schofield et al. for VEHICLE ACCESSORY MODULE, now U.S. Pat. No. 7,188,963; and/or International Publication No. WO 01/64481, published Sep. 7, 2001, which are all hereby incorporated herein by reference.

Optionally, the mirror assembly may comprise an electro-optic or electrochromic mirror assembly and may include an electro-optic or electrochromic reflective element. The electrochromic mirror element of the electrochromic mirror assembly may utilize the principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A, Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein; and/or as described in U.S. patent application Ser. No. 10/054,633, filed Jan. 22, 2002 by Lynam et al. for VEHICULAR LIGHTING SYSTEM, now U.S. Pat. No. 7,195,381, which are hereby incorporated herein by reference. The mirror assembly may include one or more other displays, such as the types disclosed in U.S. Pat. Nos. 5,530,240 and/or 6,329,925, which are hereby incorporated herein by reference, and/or display-on-demand transflective type displays, such as the types described in U.S. Pat. Nos. 5,668,663; 5,724,187 and/or 6,690,268, and/or in U.S. patent application Ser. No. 10/054,633, filed Jan. 22, 2002 by Lynam et al. for VEHICULAR LIGHTING SYSTEM, now U.S. Pat. No. 7,195,381; Ser. No. 11/021,065, filed Dec. 23, 2004, now U.S. Pat. No. 7,255,451; Ser. No. 11/226,628, filed Sep. 14, 2005; and/or Ser. No. 10/538,724, filed Jun. 13, 2005; Ser. No. 10/528,269, filed Mar. 17, 2005, now U.S. Pat. No. 7,274,501; and/or Ser. No. 10/533,762, filed May 4, 2005, now U.S. Pat. No. 7,184,190, and/or PCT Application No. PCT/US03/29776, filed Sep. 9, 2003 by Donnelly Corp. et al. for MIRROR REFLECTIVE ELEMENT ASSEMBLY, which are all hereby incorporated herein by reference, or ultra small information displays, such as are disclosed in U.S. patent application Ser. No. 10/225,851, filed Aug. 22, 2002 by Burgner for VEHICLE INFORMATION DISPLAY, now U.S. Pat. No. 6,847,487, the entire disclosure of which is hereby incorporated by reference herein. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854 and 6,420,036, and in U.S. patent application Ser. No. 10/528,269, filed Mar. 17, 2005, now U.S. Pat. No. 7,274,501, and in PCT Application No. PCT/US03/29776, filed Sep. 9, 2003 by Donnelly Corp. et al. for MIRROR REFLECTIVE ELEMENT ASSEMBLY, which are all hereby incorporated herein by reference. The coatings and/or encapsulants and the like may be selected to provide the desired appearance and features for the reflective element assembly, such as utilizing the principles described in U.S. patent application Ser. No. 11/021,065, filed Dec. 23, 2004, now U.S. Pat. No. 7,255,451; and U.S. provisional applications Ser. No. 60/563,342, filed Apr. 19, 2004 by Bareman et al. for METHOD OF MANUFACTURING ELECTRO-OPTIC MIRROR CELL; and/or Ser. No. 60/629,926, filed Nov. 22, 2004 by McCabe et al. for METHOD OF MANUFACTURING ELECTRO-OPTIC MIRROR CELL, which are hereby incorporated herein by reference.

It is further envisioned that the interior rearview mirror assembly may include a transflective one way mirror element, such as disclosed in commonly assigned U.S. patent application Ser. No. 10/054,633, filed Jan. 22, 2002 by Lynam et al. for VEHICULAR LIGHTING SYSTEM, now U.S. Pat. No. 7,195,381, which is hereby incorporated herein by reference. Preferably, the mirror reflective element (behind which a video display screen may be disposed so that the image displayed is visible by viewing through the mirror reflective element) of the interior mirror assembly comprises a transflective mirror reflector such that the mirror reflective element is significantly transmitting to visible light incident from its rear (i.e. the portion furthest from the driver in the vehicle), with at least about 15 percent transmission of light therethrough preferred, at least about 20 percent transmission of light therethrough more preferred and at least about 25 percent transmission of light therethrough most preferred, while simultaneously, the mirror reflective element is substantially reflective to visible light incident from its front (i.e. the position closest to the driver when the interior mirror assembly is mounted in the vehicle), with at least about 60 percent reflectance of light incident thereon preferred, at least about 70 percent reflectance of light incident thereon more preferred and at least about 75 percent reflectance of light incident thereon most preferred. Preferably, a transflective electrochromic reflective mirror element is used (such as is disclosed in U.S. Pat. Nos. 5,668,663; 5,724,187; and 6,690,268, the entire disclosures of which are hereby incorporated by reference herein) that comprises an electrochromic medium sandwiched between two substrates.

Optionally, the mirror assembly and/or prismatic or electrochromic reflective element may include one or more displays, such as for the accessories or circuitry described herein. The displays may be similar to those described above, or may be of types disclosed in U.S. Pat. Nos. 5,530,240 and/or 6,329,925, which are hereby incorporated herein by reference, and/or may be display-on-demand or transflective type displays, such as the types disclosed in U.S. Pat. Nos. 6,690,298; 5,668,663 and/or 5,724,187, and/or in U.S. patent application Ser. No. 10/054,633, filed Jan. 22, 2002, now U.S. Pat. No. 7,195,381; Ser. No. 11/226,628, filed Sep. 14, 2005 by Karner et al.; and/or Ser. No. 10/993,302, filed Nov. 19, 2004, now U.S. Pat. No. 7,338,177; and/or in U.S. provisional applications Ser. No. 60/525,952, filed Nov. 26, 2003 by Lynam for MIRROR REFLECTIVE ELEMENT FOR A VEHICLE; Ser. No. 60/717,093, filed Sep. 14, 2005 by Lynam; and/or Ser. No. 60/732,245, filed Nov. 1, 2005 by Weller for INTERIOR REARVIEW MIRROR ASSEMBLY WITH DISPLAY, and/or in PCT Application No, PCT/US03/29776, filed Sep. 19, 2003 by Donnelly Corp. et al. for MIRROR REFLECTIVE ELEMENT ASSEMBLY, which are all hereby incorporated herein by reference. Optionally, a prismatic reflective element may comprise a display on demand or transflective prismatic element (such as described in PCT Application No. PCT/US03/29776, filed Sep. 19, 2003 by Donnelly Corp. et al. for MIRROR REFLECTIVE ELEMENT ASSEMBLY; and/or U.S. patent application Ser. No. 10/993,302, filed Nov. 19, 2004, now U.S. Pat. No. 7,338, 177, which are all hereby incorporated herein by reference) so that the displays are viewable through the reflective element, while the display area still functions to substantially reflect light, in order to provide a generally uniform prismatic reflective element even in the areas that have display elements positioned behind the reflective element.

Optionally, the display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,690,268; 6,672,744; 6,386,742; and 6,124,886, and/or U.S. patent application Ser. No. 10/739,766, filed Dec. 18, 2003 by DeLine et al. for MODULAR REARVIEW MIRROR ASSEMBLY, now U.S. Pat. No. 6,877,888; and/or Ser. No. 10/355,454, filed Jan. 31, 2003 by Schofield et al. for VEHICLE ACCESSORY MODULE, now U.S. Pat. No. 6,824,281, and/or PCT Application No. PCT/US03/03012, filed Jan. 31, 2003 by Donnelly Corporation for VEHICLE ACCESSORY MODULE, and/or PCT Application No. PCT/US03/40611, filed Dec. 19, 2003 by Donnelly Corporation for ACCESSORY SYSTEM FOR VEHICLE, and/or PCT Application No. PCT/US04/15424, filed May 18, 2004 by Donnelly Corporation et al. for MIRROR ASSEMBLY FOR VEHICLE, and published on Dec. 2, 2004, as International Publication No. WO 2004/103772, which are hereby incorporated herein by reference.

Optionally, the mirror system or interior rearview mirror assembly and/or compass system of the present invention may include electrochromic control circuitry for controlling the reflectivity of an electrochromic mirror. The circuitry may include a rearward viewing glare detector or sensor and a forward viewing and/or downward and/or sideward viewing ambient light detector or sensor, such as described in U.S. Pat. No. 4,793,690, which is hereby incorporated herein by reference, or may include a single sensor, such as described in U.S. Pat. No. 5,193,029, which is hereby incorporated herein by reference. The output of the circuitry may control an outside electrochromic mirror as well as the interior rearview electrochromic mirror. It is further envisioned that the circuitry may control an outside electrochromic mirror, while the interior rearview mirror assembly may be a prismatic mirror, without affecting the scope of the present invention.

The network bus of the interior rearview mirror assembly may then be in communication with the reversing system of the vehicle, such that the interior rearview mirror assembly knows when the vehicle is shifted into reverse. The bus may then be operable to disable the electrochromic dimming of the mirror when the vehicle is in reverse, as is desired and known in the art.

Further, automatic dimming circuitry used in the electrochromic mirror assembly and/or in an accessory module may utilize one or more (typically two) photosensors to detect glaring and/or ambient lighting. Optionally, the mirror assembly (such as for an interior or exterior rearview mirror assembly) may include a photo sensor or light sensor (such as the types described in U.S. Pat. Nos. 6,831,268; 6,742,904; 6,737,629; 4,799,768; and 4,793,690, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which are hereby incorporated herein by reference) at the rear or fourth surface of the reflective element assembly, such that the photo sensor detects light passing through the reflective element assembly.

Examples of such configurations are described in U.S. Pat. Nos. 4,793,690; 5,550,677 and 5,193,029, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which are all hereby incorporated herein by reference. For example, a silicon photosensor, such as a TSL235R Light-to-Frequency converter (available from Texas Advanced Optoelectronic Solutions Inc. of Plano, Tex.), may be used as such a photosensor. Such light-to-frequency converters comprise the combination of a silicon photodiode and a current-to-frequency converter on a single monolithic CMOS integrated circuit.

Optionally, a silicon based optical sensor may provide a non-linear response for the electro-optic or electrochromic reflective element dimming circuitry. Optionally, an infrared (IR) filtering thin film may be deposited on the sensor (or may be disposed in front of the sensor) to filter or attenuate infrared radiation at the photo sensor. Optionally, the sensor may be mounted at the rear of the reflective element assembly and may be mounted at a black plastic surface mount that has a clear window, such that light leakage from non-intended light sources is reduced and such that the environmental properties of the sensor and mounting package are substantially enhanced.

The interior rearview mirror assembly may include the bezel portion and the casing, such as described above, or the mirror assembly may comprise other types of casings or bezel portions or the like, such as described in U.S. Pat. Nos. 6,439,755; 4,826,289; and 6,501,387; and/or PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772; and/or U.S. patent application Ser. No. 10/933,842, filed Sep. 3, 2004 by Kulas et al. for INTERIOR REARVIEW MIRROR ASSEMBLY, now U.S. Pat. No. 7,249,860; and/or Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference, without affecting the scope of the present invention. For example, the mirror assembly may comprise a flush or frameless or bezelless reflective element, such as the types described in PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772; PCT Application No. PCT/US03/35381, filed Nov. 5, 2003 by Donnelly Corp. et al. for ELECTRO-OPTIC REFLECTIVE ELEMENT ASSEMBLY; and/or in U.S. patent application Ser. No. 11/140,396, filed May 27, 2005, now U.S. Pat. No. 7,360,932; Ser. No. 11/226,628, filed Sep. 14, 2005; Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; and/or Ser. No. 10/538,724, filed Jun. 13, 2005; and/or in U.S. provisional applications Ser. No. 60/563,342, filed Apr. 19, 2004 by Bareman et al. for METHOD OF MANUFACTURING ELECTRO-OPTIC MIRROR CELL; Ser. No. 60/629,926, filed Nov. 22, 2004 by McCabe et al. for METHOD OF MANUFACTURING ELECTRO-OPTIC MIRROR CELL; Ser. No. 60/624,320, filed Nov. 2, 2004 by Uken for MIRROR ASSEMBLY FOR VEHICLE; Ser. No. 60/681,250, filed May 16, 2005; Ser. No. 60/690,400, filed Jun. 14, 2005; Ser. No. 60/695,149, filed Jun. 29, 2005; and/or Ser. No. 60/730,334, filed Oct. 26, 2005 by Baur for VEHICLE MIRROR ASSEMBLY WITH INDICIA AT REFLECTIVE ELEMENT, which are all hereby incorporated herein by reference.

Therefore, the present invention provides a mirror and compass system that positions the compass sensors within the movable head portion of the mirror assembly in a manner that reduces the effects of mirror adjustment on the sensor performance. The compass system may adjust processing in response to known movements of the mirror head to compensate for such known movements. The compass system of the present invention may distinguish between deviations, signatures or patterns indicative of magnetic anomalies or stray magnetic fields or the like generated external to the vehicle (such as by metal bridges, subway lines, cellular telephone towers, large metal structures and the like), and deviations, signatures or patterns indicative of mirror adjustments by the driver (as the driver may grasp and move the mirror head/reflective element to adjust his or her field of view rearward through the rear window of the vehicle), and may enter the calibration mode when a mirror adjustment is detected and distinguished or recognized. The compass system may enter an aggressive calibration mode to calibrate the sensors when the mirror has been adjusted by a user. The commencement of the aggressive calibration mode may be effected by the type of adjustment, vehicle speed, time elapsed since activation of the vehicle ignition or other activating or triggering event or the like.

Changes and modifications in the specifically described embodiments can be carried out without departing from the principles of the present invention, which is intended to be limited only by the scope of the appended claims as interpreted according to the principles of patent law.

The invention claimed is:

1. An interior rearview mirror system for a vehicle, said interior rearview mirror system comprising:

an interior rearview mirror assembly;

a mirror casing and a reflective element, said reflective element comprising a transflective reflective element having a transflective reflector that is partially transmitting of light therethrough and partially reflecting of light incident thereon;

wherein said reflective element is at least 15 percent transmissive of visible light incident at a rear of said reflective element;

an information display disposed behind said reflective element whereby information displayed by said information display is viewable through said transflective reflector by a driver of a vehicle when said interior rearview mirror assembly is normally mounted in the vehicle and when said information display is displaying information, and wherein said information display is substantially non-viewable through said transflective reflector by the driver of the vehicle when said information display is not displaying information;

wherein said reflective element provides a field of view rearward of the vehicle to a driver of the vehicle when said interior rearview mirror assembly is normally mounted in the vehicle, and wherein a mounting structure mounts said mirror casing to an interior portion of the vehicle, and wherein said mirror casing is adjustable relative to the interior portion of the vehicle via at least one pivot element of said mounting structure to adjust the rearward field of view of said reflective element when said interior rearview mirror assembly is normally mounted in the vehicle;

wherein said interior rearview mirror assembly comprises a compass sensor;

said compass sensor comprising at least one magnetoresponsive sensing element;

wherein said transflective reflective element comprises an electrochromic reflective element having an electrochromic medium sandwiched between two substrates;

wherein said interior rearview mirror assembly comprises a control, and wherein said control comprises control circuitry;

wherein at least a portion of said control circuitry is disposed within said mirror casing and behind said reflective element;

wherein (i) said control is responsive to a sensing of a magnetic field by said at least one sensing element and (ii) said control circuitry comprises a photosensor;

wherein said control determines a directional heading of the vehicle responsive to said sensing by said at least one sensing element, said control automatically compensating for a deviating magnetic field;

wherein said control controls dimming of said electrochromic medium responsive to detection of light by said photosensor;

wherein said information display displays the directional heading of the vehicle;

wherein electrical wiring connects to at least the portion of said control circuitry that is disposed within said mirror casing and wherein said electrical wiring passes through said at least one pivot element of said mounting structure; and wherein said control circuitry comprises at least one of (i) an A/D converter, (ii) a D/A converter, (iii) memory, (iv) signal processing circuitry, (v) filtering circuitry, (vi) a display driver and (vii) a bus interface.

2. The interior rearview mirror system of claim 1, wherein said compass sensor is disposed in said mirror casing and behind and supported by said reflective element.

3. The interior rearview mirror system of claim 2, wherein said control is operable to discern between a change in said sensing by said at least one sensing element that is indicative of an adjustment of said mirror casing by the occupant of the vehicle and a change in said sensing by said at least one sensing element that is indicative of a change in vehicle direction, and wherein said control enters a rapid compensating mode when the change in said sensing by said at least one sensing element is indicative of an adjustment of said mirror casing by the occupant of the vehicle, and wherein said control automatically exits said rapid compensating mode after a predetermined period of time has elapsed since determination of the mirror casing adjustment.

4. The interior rearview mirror system of claim 1, wherein another portion of said control circuitry is disposed at said mounting structure.

5. The interior rearview mirror system of claim 1, wherein said at least one pivot element comprises two pivot elements that are part of a double pivot mounting structure.

6. The interior rearview mirror system of claim 5, wherein said electrical wiring passes through both of said pivot elements of said double pivot mounting structure.

7. The interior rearview mirror system of claim 1, wherein said mounting structure comprises a mount for mounting said mirror assembly to a mirror mounting button attached at an interior surface of the windshield of the vehicle.

8. The interior rearview mirror system of claim 1, wherein at least one of (a) said compass sensor comprises circuitry for operation of said compass sensor when a power source is connected to said compass sensor, and (b) said at least one sensing element and at least a portion of said control circuitry are established on a semiconductor substrate having an area of less than two square centimeters.

9. The interior rearview mirror system of claim 1, wherein said compass sensor comprises one of a Hall effect sensor and a magnetoinductive sensor.

10. The interior rearview mirror system of claim 1, wherein at least one of (a) said compass sensor is oriented in a manner that reduces the effect of a mirror casing adjustment on the compass sensor output, (b) said at least one sensing element comprises at least a first magnetoresponsive sensing element and a second magnetoresponsive sensing element, and wherein said control is responsive to sensings of a magnetic field by said first and second magnetoresponsive sensing elements, and wherein said control determines the directional heading of the vehicle responsive to said sensings by said first and second magnetoresponsive sensing elements, and wherein said control is operable to discern between a change in said sensings by said first and second magnetoresponsive sensing elements that is indicative of a mirror casing adjustment and a change in said sensings by said first and second magnetoresponsive sensing elements that is indicative of a change in vehicle direction, (c) said at least one sensing element comprises at least a first magnetoresponsive sensing element and a second magnetoresponsive sensing element, and wherein said control is responsive to sensings of a magnetic field by said first and second magnetoresponsive sensing elements, and wherein said control determines the directional heading of the vehicle responsive to said sensings by said first and second magnetoresponsive sensing elements, and wherein said control is operable to discern between a change in said sensings by said first and second magnetoresponsive sensing elements that is indicative of a mirror casing adjustment and a change in said sensings by said first and second magnetoresponsive sensing elements that is indicative of a change in vehicle direction, and wherein said control enters a rapid compensating mode when the change in said sensings by said first and second magnetoresponsive sensing elements is indicative of a mirror casing adjustment by the occupant of the vehicle, and wherein said control automatically exits said rapid compensating mode after a predetermined period of time has elapsed since determination of the mirror casing adjustment, (d) said control is operable to enter an initial rapid compensating mode in response to an ignition cycle of the vehicle to achieve at least an approximate compensation for a deviating magnetic field of the vehicle, and wherein said control automatically exits said rapid compensating mode and enters a less aggressive calibration mode that distinguishes the Earth's magnetic field from magnetic anomalies and non-abrupt changes in the vehicle magnetic signature, and wherein said control automatically exits said rapid compensating mode after a predetermined period of time has elapsed since the ignition cycle, and (e) said control is operable in an automatic compensation mode to achieve at least an approximate compensation for a deviating magnetic field of the vehicle and wherein the automatic compensation does not require the vehicle to turn through a 360 degree circle to compensate for a deviating magnetic field of the vehicle.

11. The interior rearview mirror system of claim 1, wherein said compass sensor comprises a three-axis compass sensor, said at least one sensing element comprising first, second and third magnetoresponsive sensing elements.

12. The interior rearview mirror system of claim 1, wherein said information display comprises a video display, and wherein said video display is operable to display video images captured by a rearward facing camera of the vehicle, and wherein said video display comprises a backlit thin film transistor liquid crystal display.

13. The interior rearview mirror system of claim 12, wherein said video display is operable to display a compass heading.

14. The interior rearview mirror system of claim 1, wherein said information display comprises at least one of (a) a vacuum fluorescent display, (b) a light emitting diode display, (c) an electroluminescent display, (d) a liquid crystal display, (e) a backlit thin film transistor liquid crystal display and (f) a video screen display.

15. The interior rearview mirror system of claim 1, wherein said controls an illumination source via pulse width modulation.

16. The interior rearview mirror system of claim 1, wherein said interior rearview mirror system is in communication with at least one other accessory of the vehicle via a network bus of the vehicle.

17. An interior rearview mirror system for a vehicle, said interior rearview mirror system comprising:
  an interior rearview mirror assembly;
  a mirror casing and a reflective element, said reflective element comprising a transflective reflective element having a transflective reflector that is partially transmitting of light therethrough and partially reflecting of light incident thereon;
  wherein said reflective element is at least 15 percent transmissive of visible light incident at a rear of said reflective element;
  a video display disposed behind said reflective element whereby images displayed by said video display are viewable through said transflective reflector by a driver of a vehicle when said interior rearview mirror assembly is normally mounted in the vehicle and when said video display is displaying images, and wherein said video display is substantially non-viewable through said transflective reflector by the driver of the vehicle when said video display is not displaying images;
  wherein said video display comprises a backlit thin film transistor liquid crystal display;
  wherein said video display is operable to display video images captured by a rearward facing camera of the vehicle;
  wherein said reflective element provides a field of view rearward of the vehicle to a driver of the vehicle when said interior rearview mirror assembly is normally mounted in the vehicle, and wherein a mounting structure mounts said mirror casing to an interior portion of the vehicle, and wherein said mirror casing is adjustable relative to the interior portion of the vehicle via at least one pivot element of said mounting structure to adjust the rearward field of view of said reflective element when said interior rearview mirror assembly is normally mounted in the vehicle;
  wherein said transflective reflective element comprises an electrochromic reflective element having an electrochromic medium sandwiched between two substrates;
  wherein said interior rearview mirror assembly comprises a control, and wherein said control comprises control circuitry;
  wherein at least a portion of said control circuitry is disposed within said mirror casing and behind said reflective element;
  wherein said control circuitry comprises a photosensor;
  wherein said control controls dimming of said electrochromic medium responsive to detection of light by said photosensor;
  wherein said video display displays images for viewing by a driver of the vehicle when said interior rearview mirror assembly is normally mounted in the vehicle and when the driver is normally operating the vehicle;
  wherein electrical wiring connects to at least the portion of said control circuitry that is disposed within said mirror casing and wherein said electrical wiring passes through said at least one pivot element of said mounting structure; and
  wherein said interior rearview mirror system connects with a network bus of the vehicle.

18. The interior rearview mirror system of claim 17, wherein said control is responsive to a sensing of a magnetic field by at least one magnetoresponsive sensing element of a compass sensor, and wherein said control determines a directional heading of the vehicle responsive to said sensing by said at least one sensing element, said control automatically compensating for a deviating magnetic field.

19. The interior rearview mirror system of claim 18, wherein said video display is operable to display a compass heading responsive to said control determining a directional heading of the vehicle.

20. The interior rearview mirror system of claim 19, wherein said compass sensor comprises a three-axis compass sensor, said at least one magnetoresponsive sensing element comprising first, second and third magnetoresponsive sensing elements.

21. The interior rearview mirror system of claim 19, wherein another portion of said control circuitry is disposed at said mounting structure.

22. The interior rearview mirror system of claim 17, wherein said at least one pivot element comprises two pivot elements that are part of a double pivot mounting structure, and wherein said electrical wiring passes through both of said pivot elements of said double pivot mounting structure.

23. The interior rearview mirror system of claim 17, wherein said control circuitry comprises at least one of (i) an A/D converter, (ii) a D/A converter, (iii) memory, (iv) signal processing circuitry, (v) filtering circuitry, (vi) a display driver and (vii) a bus interface.

24. An interior rearview mirror system for a vehicle, said interior rearview mirror system comprising:
  an interior rearview mirror assembly;
  a mirror casing and a reflective element, said reflective element comprising a transflective reflective element having a transflective reflector that is partially transmitting of light therethrough and partially reflecting of light incident thereon;
  wherein said reflective element is at least 15 percent transmissive of visible light incident at a rear of said reflective element;
  an information display disposed behind said reflective element whereby information displayed by said information display is viewable through said transflective reflector by a driver of a vehicle when said interior rearview mirror assembly is normally mounted in the vehicle and when said information display is displaying information, and wherein said information display is substantially non-viewable through said transflective reflector by the driver of the vehicle when said information display is not displaying information;
  wherein said reflective element provides a field of view rearward of the vehicle to a driver of the vehicle when said interior rearview mirror assembly is normally mounted in the vehicle, and wherein a mounting structure mounts said mirror casing to an interior portion of the vehicle, and wherein said mirror casing is adjustable relative to the interior portion of the vehicle via at least one pivot element of said mounting structure to adjust the rearward field of view of said reflective element when said interior rearview mirror assembly is normally mounted in the vehicle;

wherein said interior rearview mirror assembly comprises a compass sensor;

said compass sensor comprising magnetoresponsive sensing elements, and wherein said compass sensor comprises a three-axis compass sensor, said magnetoresponsive sensing elements comprising first, second and third magnetoresponsive sensing elements;

wherein said transflective reflective element comprises an electrochromic reflective element having an electrochromic medium sandwiched between two substrates;

wherein said interior rearview mirror assembly comprises a control, and wherein said control comprises control circuitry;

wherein at least a portion of said control circuitry is disposed within said mirror casing and behind said reflective element;

wherein (i) said control is responsive to a sensing of a magnetic field by said sensing elements and (ii) said control circuitry comprises a photosensor;

wherein said control determines a directional heading of the vehicle responsive to said sensing by said sensing elements, said control automatically compensating for a deviating magnetic field;

wherein said control controls dimming of said electrochromic medium responsive to detection of light by said photosensor;

wherein said information display displays the directional heading of the vehicle;

wherein electrical wiring connects to at least the portion of said control circuitry that is disposed within said mirror casing and wherein said electrical wiring passes through said at least one pivot element of said mounting structure;

wherein said control circuitry comprises at least one of (i) an A/D converter, (ii) a D/A converter, (iii) memory, (iv) signal processing circuitry, (v) filtering circuitry, (vi) a display driver and (vii) a bus interface; and wherein said interior rearview mirror system is in communication with at least one other accessory of the vehicle via a network bus of the vehicle.

25. The interior rearview mirror system of claim 24, wherein another portion of said control circuitry is disposed at said mounting structure.

26. The interior rearview mirror system of claim 24, wherein said at least one pivot element comprises two pivot elements that are part of a double pivot mounting structure, and wherein said electrical wiring passes through both of said pivot elements of said double pivot mounting structure.

27. The interior rearview mirror system of claim 24, wherein said information display comprises a video display, and wherein said video display is operable to display video images captured by a rearward facing camera of the vehicle, and wherein said video display comprises a backlit thin film transistor liquid crystal display.

28. The interior rearview mirror system of claim 27, wherein said video display is operable to display a compass heading.

* * * * *

UNITED STATES PATENT AND TRADEMARK OFFICE
CERTIFICATE OF CORRECTION

PATENT NO. : 7,726,822 B2
APPLICATION NO. : 12/575726
DATED : June 1, 2010
INVENTOR(S) : Rodney K. Blank, Kenneth L. Schierbeek and Niall R. Lynam It is certified that error appears in the above-identified patent and that said Letters Patent is hereby corrected as shown below:

Column 6
Line 12, "Nov. 19, 2604" should be --Nov. 19, 2004--

Column 19
Line 49, delete "p" after "emitting"
Line 50, delete "F" after "appropriate"

Column 29
Line 51, "such as WJFI" should be --such as WIFI--

Signed and Sealed this

Twelfth Day of October, 2010

David J. Kappos
*Director of the United States Patent and Trademark Office*